US007110981B1

(12) United States Patent
Sidikman et al.

(10) Patent No.: US 7,110,981 B1
(45) Date of Patent: Sep. 19, 2006

(54) METHOD AND SYSTEM FOR PROVIDING INTEGRATED BROKERAGE AND OTHER FINANCIAL SERVICES THROUGH CUSTOMER ACTIVATED TERMINALS

(75) Inventors: Paul Sidikman, Livingston, NJ (US); Lawrence D. Weiss, Skaneatles, NY (US)

(73) Assignee: Citibank, N.A., New York, NY (US)

( * ) Notice: Subject to any disclaimer, the term of this patent is extended or adjusted under 35 U.S.C. 154(b) by 850 days.

(21) Appl. No.: 09/006,839

(22) Filed: Jan. 12, 1998

Related U.S. Application Data

(63) Continuation of application No. 08/483,710, filed on Jun. 7, 1995, now abandoned.

(51) Int. Cl.
*G06F 17/60* (2006.01)

(52) U.S. Cl. .......................... 705/43; 705/37; 235/381

(58) Field of Classification Search ............... 705/35, 705/36, 37, 42, 43; 235/379, 380, 381
See application file for complete search history.

(56) References Cited

U.S. PATENT DOCUMENTS

| | | | |
|---|---|---|---|
| RE30,773 E | 10/1981 | Glaser et al. ............... 235/379 |
| 4,376,978 A | 3/1983 | Musmanno |
| 4,597,046 A | 6/1986 | Musmanno et al. |
| 4,674,044 A | 6/1987 | Kalmus et al. |
| 4,694,397 A | 9/1987 | Grant et al. |
| 4,774,663 A | 9/1988 | Musmanno et al. |
| 4,991,199 A | 2/1991 | Parekh et al. |
| 5,008,927 A | 4/1991 | Weiss et al. |
| 5,025,373 A | 6/1991 | Keyser, Jr. et al. ............ 705/42 |
| 5,159,667 A | 10/1992 | Borrey et al. ............... 715/500 |
| 5,168,444 A | 12/1992 | Cukor et al. .................... 705/1 |
| 5,170,466 A | 12/1992 | Rogan et al. ............... 715/530 |
| 5,195,130 A | 3/1993 | Weiss et al. |
| 5,220,501 A | 6/1993 | Lawlor et al. ................ 705/40 |
| 5,270,922 A | 12/1993 | Higgins |
| 5,321,840 A | 6/1994 | Ahlin et al. |
| 5,523,433 A | 6/1996 | Toney et al. ................ 554/114 |

FOREIGN PATENT DOCUMENTS

WO    WO00941836 A1 * 5/1994

OTHER PUBLICATIONS

"Banks deevelopping ATMs that make stock trades Anonymous", Bank Letter, v 8, n 38, p 1, 11-12, Sep. 1984.*
American Banker "ATMs May Give Banks Added Firepower in Funds War", Investment Products, vol. 158, No. 77, p. 1, Apr. 1993.*
American Banker "Welles Frago Lets Customers Use ATMs to Buy and Redeem its Equity Funds", Investment Products, vol. 158, No. 156, p. 10, Aug. 1993.*

(Continued)

*Primary Examiner*—Hani M. Kazimi
(74) *Attorney, Agent, or Firm*—George T. Marcou; Kilpatrick Stockton LLP

(57) ABSTRACT

A method and system for providing integrated financial services including brokerage services through an ATM network permits trading of securities, portfolio evaluation, security price evaluation, and brokerage account inquiries. The invention utilizes a familiar customer interface, a standard ATM or a customer activated terminal, to provide brokerage functions with a network conventionally used to perform traditional banking functions. The system and method according to the invention provides for trading of a wide variety of publicly traded security by linking the customer to a brokerage system. Provisions are further made for obtaining real time price quotations for up-to-the-minute portfolio evaluation and accurate buy and sell orders.

19 Claims, 32 Drawing Sheets

OTHER PUBLICATIONS

"Trade It Yourself Bank Machines Make a Debut Securities", Los Angeles Times, Home Edition, Business Section, p. 1, co. 5, Oct. 1994.*

International Preliminary Examination Report for Application No. PCT/US96/08690, dated Sep. 8, 1997.

Written Opinion for Application No. PCT/US96/08690, dated Apr. 28, 1997.

International Search Report for Application No. PCT/US96/08690, dated Aug. 23, 1996.

A. Etherington, "The DIP Alternative," *Accountancy*, vol. 115, No. 1218, pp. 60-62, Feb. 1995.

D. Cope, "Equity Funds by ATM Seen as Wave of Future," *American Banker*, vol. 158, No. 157, Aug. 17, 1993.

"Bankers Welcome Mutual Funds to the Self-Service Family," *Bank Network News*, 3 pp., Oct. 13, 1993.

Tracy, Eleanor Johnson, "Push-Button Brokerage in the Bank Lobby," *Fortune*, vol. 110, 2 pp., Dec. 24, 1984.

Reding, Tom, "Digital Imaging Technology: What, Where, and Why in Commercial Nuclear Power," *Nuclear Plant Journal*, 3 pp., Jul.-Aug. 1991.

Black, David, "The New Breed of Mixed-Media Image Management Systems," *IMC Journal*, pp. 9-13, Jan./Feb. 1989.

Walter, Gerry, "Optical Digital Data Disk Systems for the Management and Dissemination of Office and Engineering Documents," *International Journal of Micrographics & Video Technology*, vol. 4, No. 1, pp. 21-30, 1985.

* cited by examiner

METHOD AND SYSTEM FOR PROVIDING INTEGRATED BROKERAGE AND OTHER FINANCIAL SERVICES THROUGH CUSTOMER ACTIVATED TERMINALS

CROSS-REFERENCE TO RELATED APPLICATION

This is a continuation of commonly owned application entitled "INTEGRATED FULL SERVICE CONSUMER BANKING SYSTEM AND SYSTEM AND METHOD FOR OPENING AN ACCOUNT," Ser. No. 08/483,710, filed Jun. 7, 1995, now abandoned the disclosure of which is incorporated by reference herein.

FIELD OF THE INVENTION

This invention relates to a method and a system for providing brokerage services through a network of automated teller machines. In particular, it relates to a method and system for buying and selling securities and for obtaining security price quotations.

BACKGROUND OF THE INVENTION

In the past, financial services have been made available in various ways depending on the type of service being offered. For a variety of reasons, the methods of providing brokerage services, such as the buying and selling of securities, and of providing traditional banking services, such as depositing and withdrawing funds, have been extremely divergent. For example, customers usually accessed banking services in the past through person to person service at branch locations. More recently, the trend is toward increased automation of customer banking transactions primarily through use of automatic teller machines (ATMs). On the other hand, many brokerage services are often initiated by direct customer-broker contact, for example, over the telephone or by facsimile. Once an order is received, the brokerage company performs the requested service, such as buying or selling a particular security at the appropriate exchange.

For many customers, dealing with a service provider in person can prove to be burdensome. For instance, in order to buy a particular security, the customer will generally verify the current selling price of a security to be purchased and then contact a broker to request that the purchase be made. One or both of these steps introduces a time lag which may result in the transaction failing to go through as intended by the customer.

Recent technological developments have somewhat improved brokerage services. In particular, improved communications methods have made it easier for a customer to contact a broker to place an orders or to obtain information. Other new methods have also made it easier for the broker to implement orders and to obtain up-to-date information regarding security prices. For example, U.S. Pat. Nos. 4,376,978, 4,597,046 and 4,774,663 describe a system for supervising a margin securities account wherein the system verifies various account activities, such as check cashing, and determines available credit so as to maintain free credit cash in one or more short term accounts. U.S. Pat. No. 4,674,044 describes an automated securities trading system. U.S. Pat. No. 5,270,922 describes a system for providing financial information such as market ticket, quotation and news information.

While providing many benefits, such prior art systems are generally limited to use by brokers or more sophisticated, affluent consumers who generate a fairly large volume of transactions. Moreover, while keeping track of certain other financial transactions for the purpose of preventing floats, these systems generally lack integration with non-brokerage financial transactions. In particular, most lack any means of providing the functions traditionally made available through a bank teller, such as depositing and receiving funds.

Some attempts have been made both to increase the availability of the financial services to a greater portion of the consumer market and to integrate various financial transactions. For example, the development of networks of automatic teller machines (ATMs) have greatly expanded the hours of operation during which banking services are available, while reducing operating costs. Generally, these machines have been used to reproduce the most common functions traditionally provided by a bank teller, such as receiving deposits, dispensing funds from a customers accounts, and responding to balance inquiries.

The assignee of the present invention has been an industry leader in developing improved techniques for delivery banking services. These techniques have particularly enhanced the customer's means of accessing various banking transactions. FIG. 1A illustrates some of the access points through which such services are made available to customers. These include an enhanced telephone 2, a personal computer 4, and a customer activated terminal (CAT) 6. As shown, the enhanced telephone 2 and the personal computer 4 provide access points to a proprietary service platform 8 known as home services delivery system (HSDS) 8. HSDS 8 interfaces with a front end system 10 referred to as a transaction processing system (TPS) which is described in more detail below. Other access points 12 may include telephone or personal contact with bank representatives who can access the system on behalf of the customer.

In general, the terminals illustrated in FIG. 1A provide uniformity with regard to the interface between the customer and the bank's system. For example, the terminology used and the sequences of the displays by which the customer exchanges information present a high degree of consistency. This promotes ease of use and encourages a customer's reliance on automated delivery systems to perform banking transactions, rather than less efficient person to person contact between a customer and a bank representative.

Personal computers such as the one illustrated in FIG. 1A are well known in the art and require no further description. Enhanced telephones have been developed by an affiliate of the assignee, and are described in several patents, including U.S. Pat. Nos. 4,991,199, 5,088,927, 5,195,130, and 5,321,840.

The CAT referred to in FIG. 1A is a particular type of ATM built for the assignee and its affiliates by Citicorp Transaction Technology Inc. Unlike many other ATMs which function primarily or solely as cash dispensing machines, CATs provide a wide range of banking functionality. These include "basic" services such as cash withdrawal, deposits and payments, transfer between accounts, balance inquiries, transaction histories, and purchases of travellers checks. As shown in FIG. 1B, a CAT 6 includes structures generally corresponding to those found in a conventional ATM to carry out these functions. Standard structures include a magnetic card reader 22 for reading information encoded on a customer's card, a depository 24 for accepting deposit and payment envelopes, and a cash dispensing mechanism 26. Internal components include a processor 30 and a communications device 32 for data communication with a host system 10.

The CAT 6 also utilizes more advanced structures in comparison to many conventional ATMs. For example, the primary customer interface is a dynamic touch screen 28 which utilizes color graphics. This interface is more versatile than many other ATMs in that it is readily reconfigurable so as to accommodate changing newly developed functionality. Moreover, it provides an interactive display in which buttons and keys are replaced with images of familiar three-dimensional objects.

It will be appreciated that the enhanced telephone 2 and the personal computer 4 shown in FIG. 1A differ dramatically from the CAT 6 in that the former include no means to perform mechanical functions through a fund depository or a dispensing mechanism. However, all the data terminals illustrated in FIG. 1A, including the CAT 6, the enhanced telephone 2 and the personal computer 4 provide a substantially uniform interface for performing many other financial transactions. These financial transactions include traditional banking functions, such as transferring funds between a checking account and a savings account. Additionally, several of the access points referred to in FIG. 1A can be used to perform "non-traditional" functions, such as bill payment, information retrieval, and access to customer accounts for mutual funds offered by the present assignee and/or its affiliates. In particular, data terminals such as the CAT 6, the enhanced telephone 2, and the personal computer 4, have been used by customers to transfer funds among money market accounts, checking accounts, and savings accounts. They have also been used to purchase, redeem and exchange shares of mutual funds offered by companies affiliated with the assignee of the present invention. Delayed price quotations through a vendor of such services have also been made available. Thus, these access points form a part of a increasingly integrated financial system.

While providing many benefits, the services available through the systems described in reference to FIGS. 1A and 1B were limited in several respects. Foremost, no provision was made to buy, sell, or receive price quotations for the vast array of securities publicly available through various exchanges and other financial institutions. Instead, only a limited number of funds were available through an affiliated company. Moreover, being limited primarily to money market accounts, a danger existed that a less-sophisticated customer would not adequately distinguish between a transfer of funds between a federally insured account, such as a standard checking account, and a non-insured account.

SUMMARY OF THE INVENTION

In view of the limitations which have characterized previous financial service networks, it is an object of the invention to provide a system and a method for offering brokerage services through an ATM network. In particular it is an object of the invention to provide a system and method by which consumers can readily buy and sell securities, obtain brokerage account information, and obtain current security price information.

It is a further object of the invention to offer the above-mentioned services through a preexisting network that is familiar to customers, such as an ATM network.

It is yet another object of the invention to conveniently provide brokerage services in conjunction with other financial services, for example, bill payment, and deposits, withdrawals and transfers, but in a manner which does not interfere with a customer's ability to distinguish between brokerage transactions and such other financial services.

In fulfillment of these various objects and others, disclosed is an integrated financial system comprising an automated teller machine for providing a customer interface to the financial system. The automated teller machine includes processor means, input means for receiving customer information from a customer, display means for displaying information to the customer, and a dispenser mechanism, wherein the processor means receives the customer information and controls the display and the dispensing mechanism. The system also includes first communication means for remote transmission of first data from the automated teller machine to a front end processor system. The front end system is coupled to the first communication means and interprets the data from the automated teller machine. It provides data to the automated teller machine whereby the front end processor system controls a plurality of customer interactive processes implemented through the automated teller machine processor means. The system also includes second communication means for transmission of third data from the front end processor system and a brokerage system. The brokerage system receives data from the front end processor system through the second communications means and provides fourth data thereto. The brokerage system maintains a record corresponding to a brokerage account, which includes indicia of the number and type of securities held on behalf of the customer. Further, the brokerage system receives trade orders from the customer through the automated teller machine and the front end system and places orders to implement the orders.

According to a feature of the invention, the integrated system further includes a quotation system for providing securities price information substantially in real time through the brokerage system, the front end processor and the automated teller machine.

According to another feature of the inventor, the system also includes means to compute a current value of securities held on behalf of a customer based on the securities price information, wherein the current value is displayed to the customer with the automated teller machine upon request of the customer.

According to still another feature of the invention, the securities include stocks, bonds, and mutual funds.

According to yet another feature of the invention, the display means and the input means comprise a touch screen display.

According to still another feature of the invention, the system includes means for cross referencing a security symbol with other information, including a security name, in response to a customer request.

DESCRIPTION OF THE PREFERRED
EMBODIMENTS OF THE INVENTION

A. Definitions

Exemplary embodiments of the invention are set forth below with reference to the drawings. Merely to facilitate understanding of this description and not for purposes of limitation, the following definitions are provided:

Background Message: A message sent from the CAT to the host processor that does not require the CAT to wait for an immediate response. Several such messages are shown in the accompanying flow charts.

ATM (automated teller machine): A terminal used for banking transactions which includes a customer input device (usually a keypad), a card reader, and a cash dispensing apparatus. An example of a prior art ATM is described in U.S. Reissue Pat. No. RE 30,773, the disclosure of which is incorporated by reference herein.

BATS (brokerage automated trading system): An automated system used to receive ordered transactions, to record and edit such orders, and to formulate and transmit order messages to a brokerage account manager.

BIN (Branch Identification Number): A number embossed and/or encoded on debit and credit cards indicating the institution which issued the card.

CAT (Customer Activated Terminal): A customer activated, touch screen terminal utilizing color graphics. This terminal receives input from a customer through a card reader, a depository slot, and touch areas of the touch screen display. It provides an interface to a front end or host computer.

CIN (customer identification number): An identification number assigned to a customer that is returned by the host system as part of an account profile message.

CPS (cross product services) A regional interface which provides multi-region access to various applications.

ESP (external service provider): A system, usually a FEP, which provides data to the CAT. Most messages usually consist of a request from the CAT and a response from the FEP.

FEP (front end processor): A system to which CATs are connected which provide service provider information and network control.

FIMP (financial institution marketing product code): A code returned by the host system as part of an account profiling message which represents the location where the customer's account is processed and serviced.

Integrator: A part of a software environment which handles details of message processing to the host or FEP, including initialization process, application requests, function retries, and ESP status.

PIN (personal identification number) or PIC (personal identification code): A number selected or provided to a customer which is required to access the system so as to provide system security.

TPS (transaction processing system): An on-line transaction processing system (front end processor) that supports both financial and non-financial transactions requested at various terminal interfaces, including CATs, in order to process and implement requested various transactions.

B. System Overview (FIG. 2)

Figure 2:
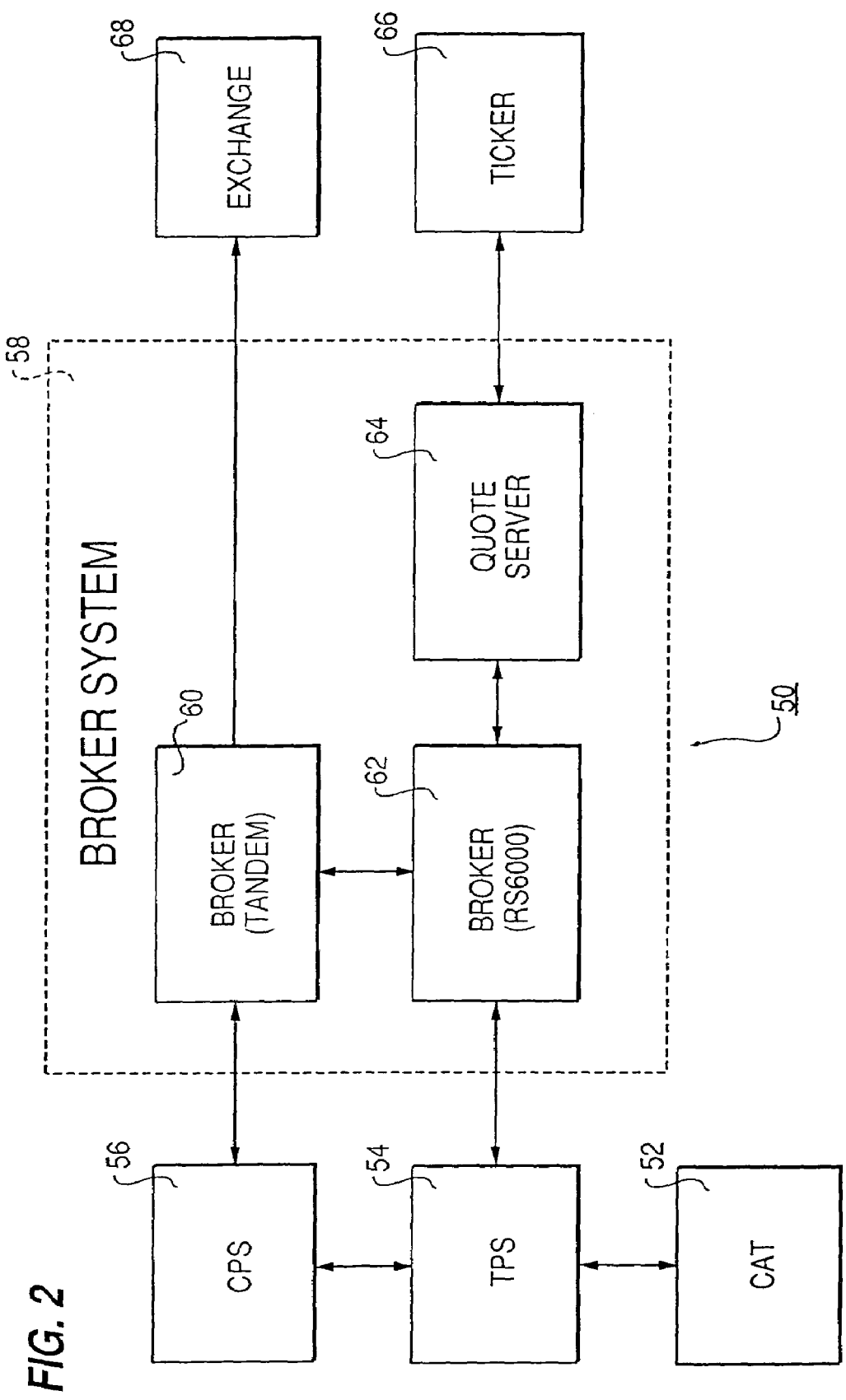
FIG. 2 is a block diagram showing a top level view of a system according to the invention.

FIG. 2 is a block representation of various individual systems and interfaces which together comprise an integrated banking and brokerage system 50 according to the invention. As shown, a plurality of customer activated terminals, represented collectively by a CAT (ATM) 52 exchanges data with a front end processor 54, referred to as a TPS. As explained in detail below, the TPS 54 accesses customer account information required to process a customer requested transaction by first referring to a cross reference file (not shown) containing data elements linking the customer's CIN, the BIN the FIMP and other information on the customer's card.

The TPS 54 communicates with a regional interface 56 (referred to as CPS) which provides access to various applications. In the example shown in FIG. 2, CAT orders are sent via the TPS 54 to the CPS 56 region. The CPS 56 provides a gateway to the brokerage system 58 consisting of two linked systems, a Tandem system 60 and a RS6000 system 62. The brokerage system 58 provides information, such as buy and sell orders, which are sent to appropriate persons at various securities exchanges 68. The brokerage system 58 also obtains quotation and portfolio information which is then provided to the customer through the TPS 54.

Real time quotes are obtained through a quote server 64 which is connected to a track ticker 66.

As described in greater detail below, the CPS 56 creates and edits both order logs and transaction files based on request from the CAT 52. These order logs and transaction files are used by the brokerage system 58 to provide price quotations and to place buy and sell orders. The CPS 56 also provides a symbol directory (not shown) to interpret securities symbols utilized by the customer. As will be appreciated by those skilled in the art, the systems and interfaces shown in FIG. 2 include any range of suitable hardware, including processors and associated memory, to implement the methods described herein.

C. Overview of System Operation

1. First Embodiment (FIGS. 3–13)

Within the framework of this system, it is possible for a customer to use a CAT network to perform various brokerage services, including the buying and selling of securities, the pricing of securities, and the computing of portfolio value. FIGS. 3 to 13 are flow charts which illustrate a first method by which such services, and others, are made available to a customer through a CAT.

Figure 3:
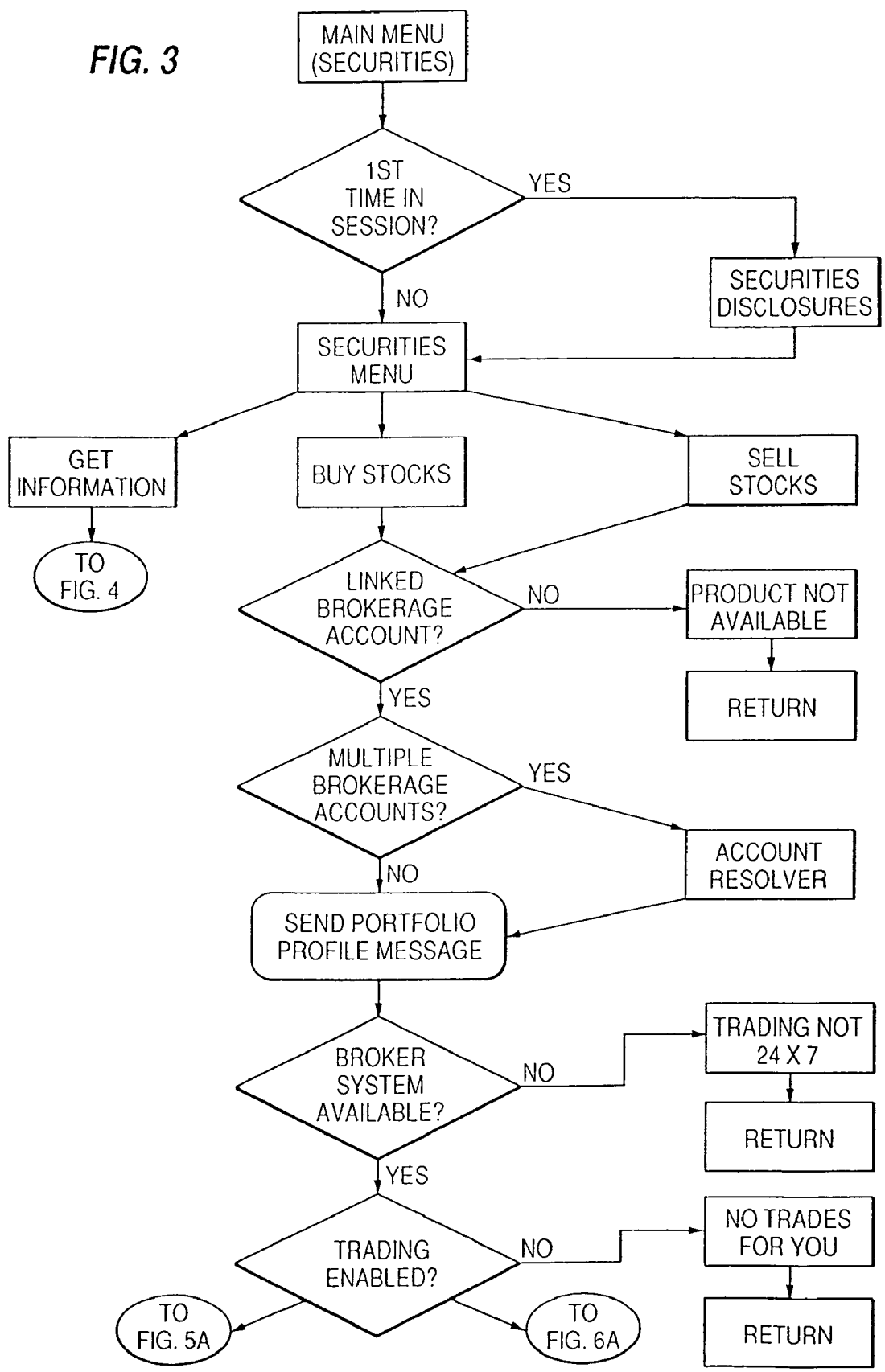
FIG. 3 is a partial flow chart of a system according to a first embodiment of the invention.

As shown in FIG. 3, a customer accesses a main menu displayed on the CAT in a manner known in the art by inserting a customer card and inputting a PIN. This information is providing to the front end. The front end consults stored information to verify the customer's account information in a manner known in the art.

In accordance with the invention, the customer is then presented with an option display including an option entitled "Securities", which permits the customer to access various brokerage services. In order to ensure compliance with various regulatory requirements, this message preferably includes the disclaimer "not FDIC insured" and can be selected by touching a position of the CAT touch-screen where the message is displayed, thus reenforcing in the customer's mind that he or she is entering a new environment.

When the securities option is selected by the customer, it is determined whether it is the customer's first time accessing the securities environment in a particular session. This information is maintained by the system by updating a variable each time the securities environment is accessed. If it is the first time accessing the securities environment, an appropriate securities disclosure statement is displayed in conformance with various federal and state requirements. For example, the securities disclosure screen notifies the customer that securities are not FDIC insured. The screen also queries the customer whether the customer would like to continue after having viewed the disclosure screen. If not, the customer may return to a previous menu of services provided through the CAT by means of a prompt asking, "May I help you with something else" and a display of YES/NO/EXIT keys on the touch screen. If securities options are desired by the customer, the CAT provides a securities menu.

The securities menu offers the following options: "get information", "buy stocks", or "sell stocks". The "get information" option is explained in greater detail below with reference to FIG. 4. If either the "buy stocks" or "sell stocks" options are selected, the system determines whether the customer has previously opened a brokerage account permitting brokerage activity by consulting a stored record of the customer account information. If the customer has no brokerage account, an appropriate message, such as "product not available" is displayed, and the customer is returned to other options available through the system. If it is determined that a brokerage account is available, the customer's account information is reviewed to determine whether the customer has multiple brokerage accounts. If so, the system determines which account the customer desires to access by displaying all accounts and prompting the customer to select an appropriate account for which a transaction is to be requested. A portfolio profile message is displayed to the customer indicating the assets included in the selected account. This is accomplished by the system consulting a file containing information regarding the customer's brokerage account. The front end system then determines whether the brokerage system is available. If not, a message indicating that trading is not presently available 24 hours a day, seven days a week is displayed. For example, the system displays a message such as, "I'm sorry, I can't place trades for you from TIME A to TIME B business days and TIME C Sunday to TIME D Monday", where A to D are system variables representing times of the day. The customer is then returned to a previous option menu.

On the other hand, if it is determined that the brokerage system is available, the front end system queries the brokerage system to determine if trading is currently restricted in any respect. For example, the front end system determines whether there are no restrictions on trading, whether only selling is available, or whether no trading whatsoever is permitted based on a data element from the brokerage system. In the latter case, an appropriate message such as "no trades are now allowed" is displayed and the customer is returned to a previous options menu. On the other hand, if buying and/or selling is permitted, either the buying stocks process shown at FIGS. 5A to 5D, or the selling stocks option shown at FIGS. 6A to 6C are implemented.

Figure 4:
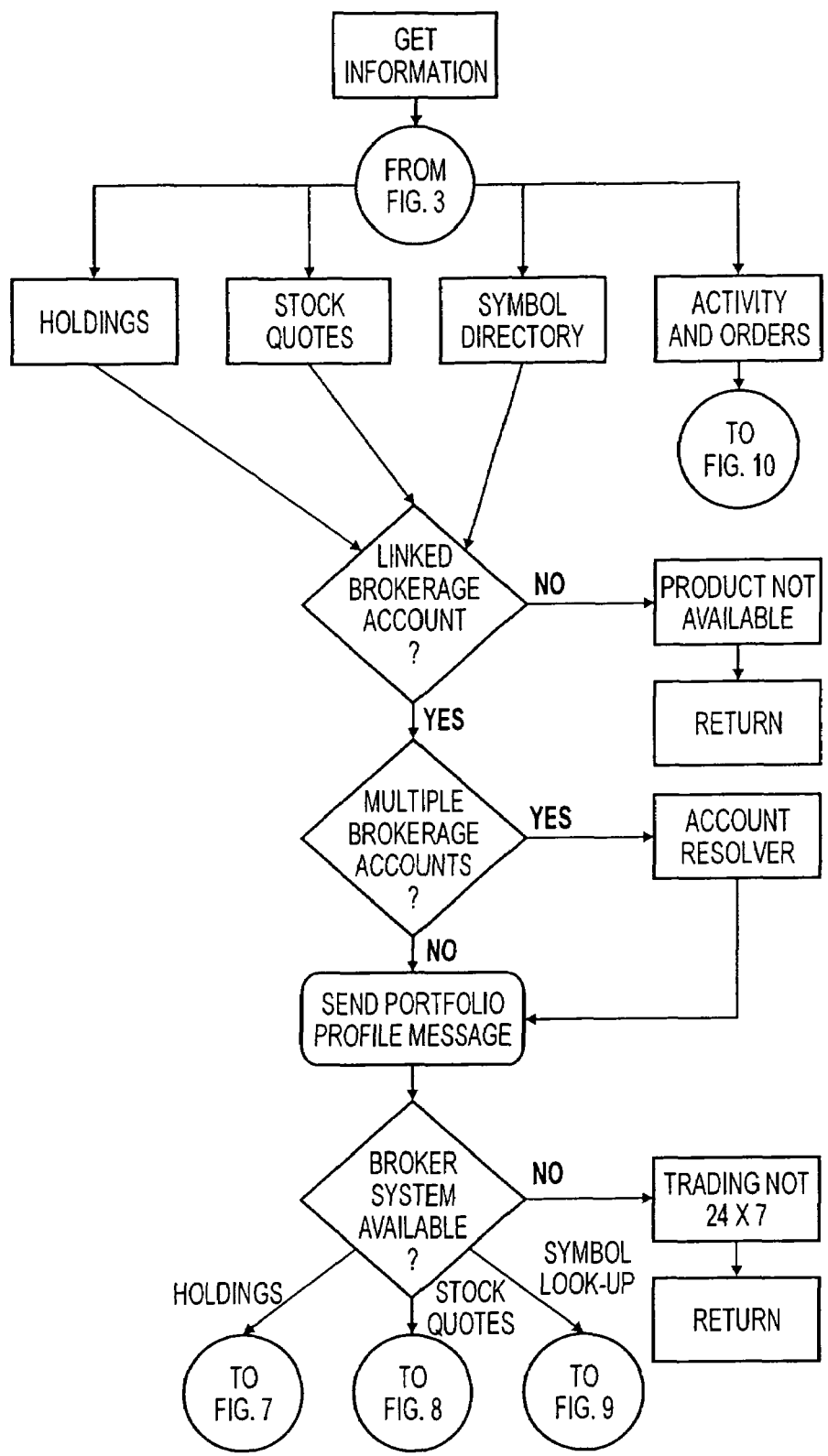
FIG. 4 is a continuation of the process illustrated in FIG. 3.
Figure 10:
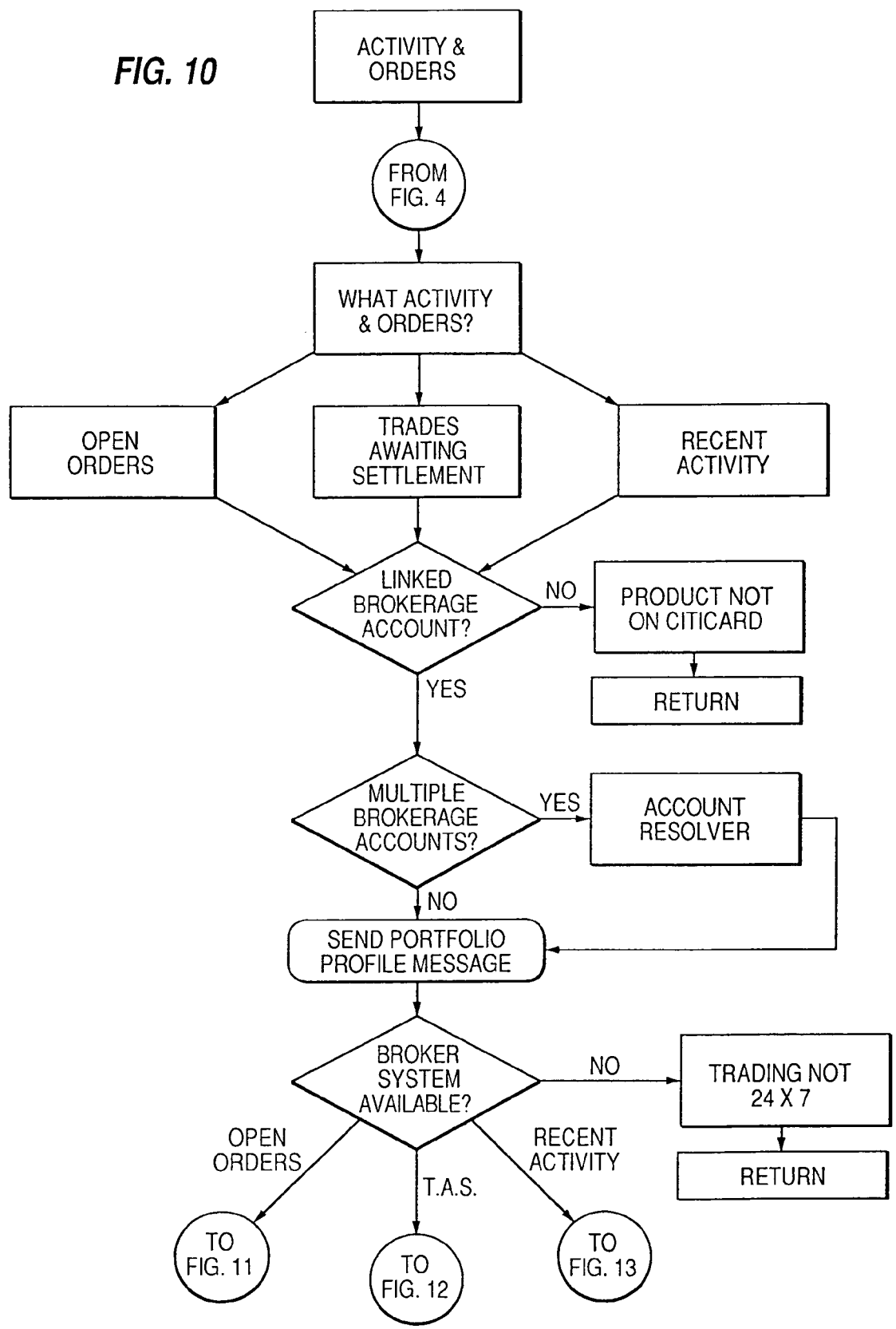
FIG. 10 is a flow chart illustrating a process for obtaining activity in orders information in accordance with a first embodiment of the present invention.

If the customer wishes to obtain information by selecting a "get information" option from the securities menu, the customer is provided with options illustrated in FIG. 4. These options include a "holdings" option, a "stock quotes" option, and a "symbol directory" option, and an "activity and orders" option. In the event that the "activity and orders" option is selected, the process continues as shown in FIG. 10, described below.

If any of the first three options are selected, the system determines whether the customer has a brokerage account, as described above. If not, the "product not available" screen is displayed and the customer is returned to a previous options menu. If the customer has at least one brokerage account, it is then determined how many different accounts are available. If more than one is available, the system prompts the customer to select the account for which information is being requested in the manner described above. Once an account is selected in this manner, account profile information is displayed to the customer as described above in FIG. 3.

Figure 8:
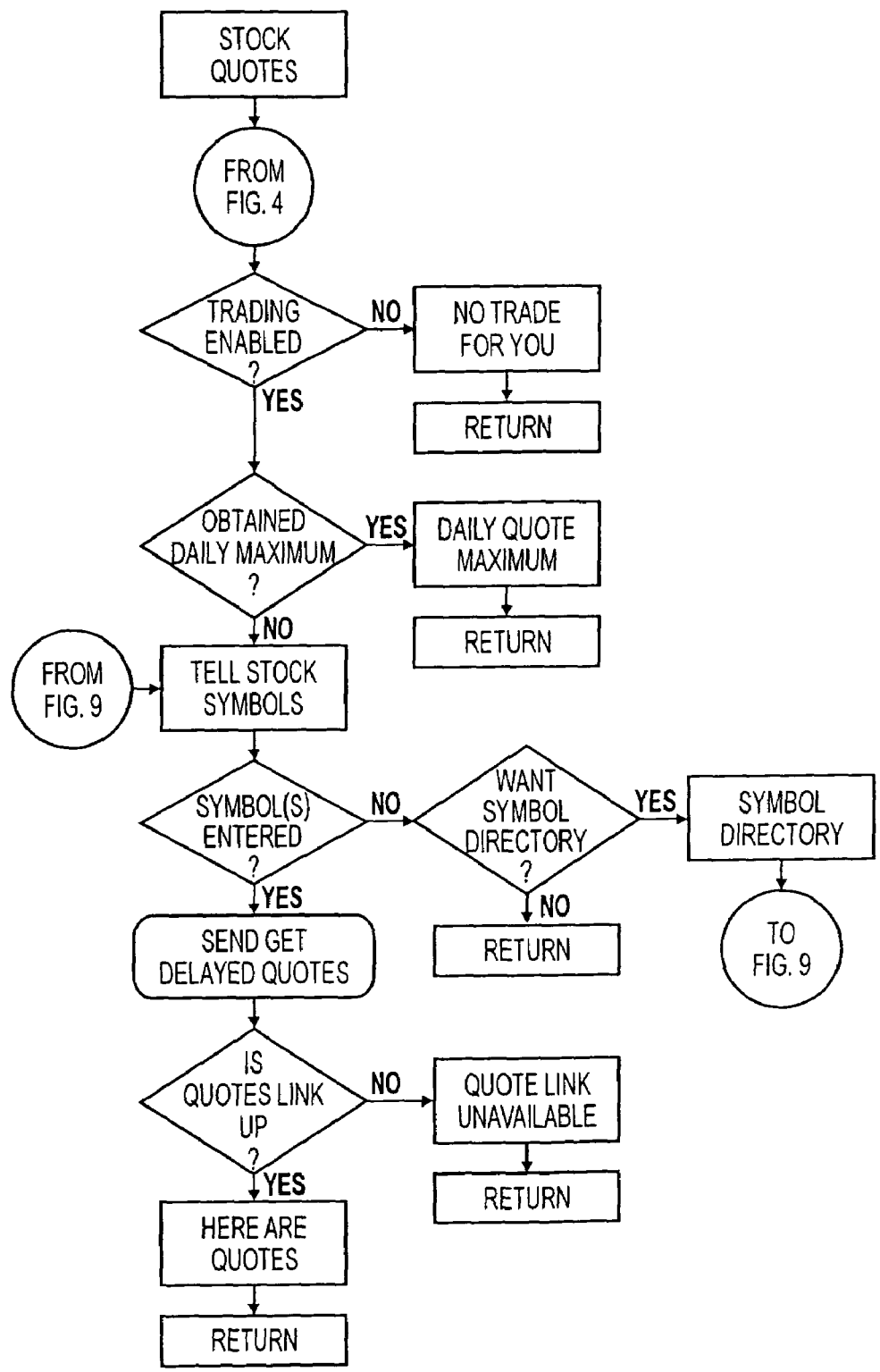
FIG. 8 is a flow chart illustrating a process for displaying stock quotations in accordance with a first embodiment of the present invention.
Figure 9:
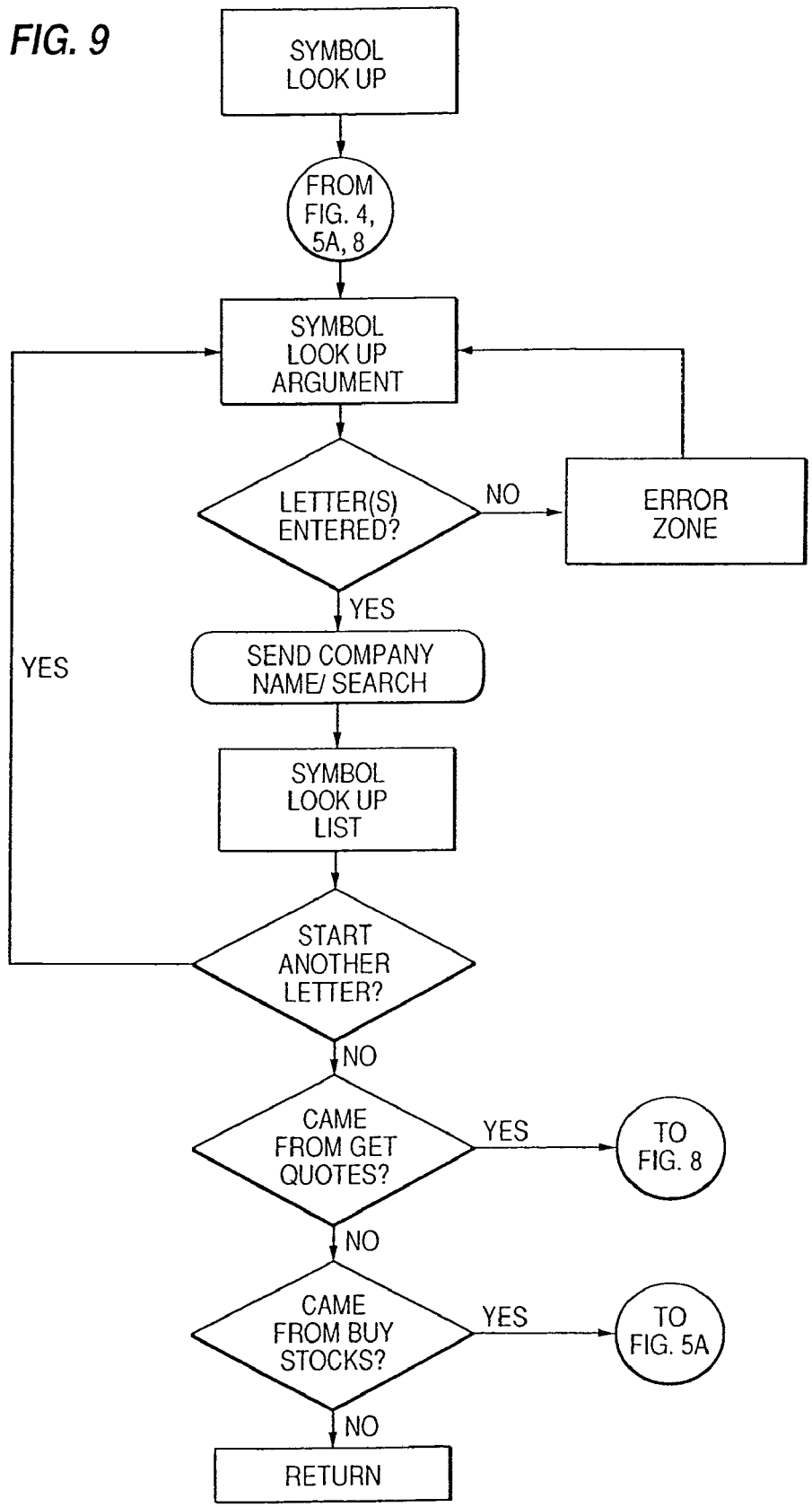
FIG. 9 is a flow chart illustrating a process for obtaining securities symbols in accordance with a first embodiment of the present invention.

The front end system then determines whether the brokerage system is available for providing the requested information. If not, an appropriate message is displayed as described above and the customer is returned to a previous options menu. If the brokerage system is available, the process continues as shown in FIG. 7, FIG. 8 or FIG. 9, depending on which respective option, "holdings", "stock quotes", or "symbol directory", had been selected by the customer.

Figure 7:
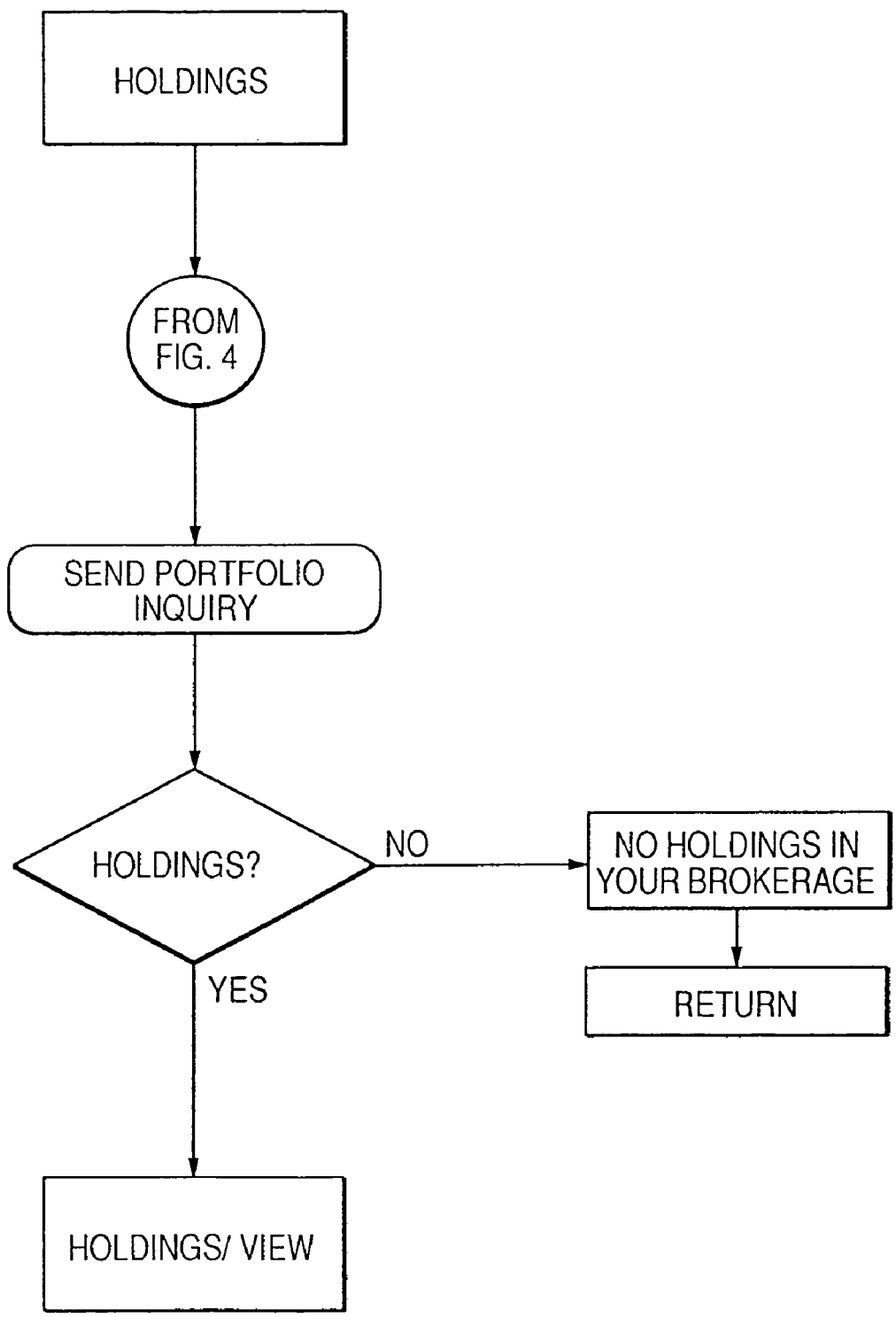
FIG. 7 is a flow chart showing a process for displaying portfolio information in accordance with a first embodiment of the invention.

As shown in FIG. 7, if the "holdings" options had been selected, a portfolio inquiry is made by the system and an response showing each holding and total asset value is displayed based on data segments provided to the CAT. This is accomplished by first determining whether the customer has any holdings in his or her brokerage account. If not, the system displays an appropriate message indicating that no holdings are present, and the customer is returned to an earlier screen. If holdings are present, holdings are displayed in the following manner, where the first column shows the line number of text on the screen, the second column is the text and/or variable displayed, and the third column provides comments corresponding to each line of text.

| Line | Text or Variables | Comments |
| --- | --- | --- |
| 1 | "Here are your holdings" | |
| N (max through N + 3) | {Security Name} xxxxxx "as of MMM DD": | 1st variable, as transmitted: for most securities, X(30); for pref stock, 2•X(30); for mutual funds, 2•X(30); for muni bonds, 4•X(30); for T Notes/T Bonds, X(30) + z9.999% Due MM/DD/YY; for T Bills, X(30+ Dated MM/DD/YY Due MM/DD/YY 2nd variable: "shares" if stock or mutual fund; otherwise suppressed 3rd variable, as of date (if price date different from last business date; otherwise blank) |
| Next line (max to N + 4) | {account} | "short", "margin", "pledged" (displayed only if appropriate); |
| Next line (max to N + 5) | zz, zzz, zz9.zzz at zzzz9.zzz | 1st variable, number of shares; 2nd variable, share price (if security unpriced, display "Unpriced" instead of "at z.zz9.zzz); 3rd variable, NAV (displayed for Mutual Funds only) |
| Next line (max to N + 6) | "Value:" $zzz,zzz,zz9.99 | variable, security value (if security unpriced, display "Unpriced" instead of "Value:" zzz,zzz,zz9.99); |
| Next line (max to N + 7) | {Annuities Disclosure} | If a fixed annuity only, display "Your fixed annuities are reported here with your other non-FDIC insured investments for your convenience, even though they are not securities" |

After all securities have been displayed, totals are provided, in the following order:

1) If customer has at least one fully owned/cash account security, "Market value of Securities, $zzz,zzz,zz9.99", is displayed. If at least one security is unpriced, a disclaimer, "Not including unpriced securities", is also displayed;

2) If the customer has a cash balance, "Cash balance $zzz,zzz,zz9.99" is displayed;

3) If the customer has a credit interest balance, "Credit interest balance $zzz,zzz,zz9.99" is displayed;

4) If customer has at least one margined security, "Margin account balance, $zzz,zzz,zz9.99" is displayed.

5) If customer has at least one shorted security, "Short account balance, $zzz,zzz,zz9.99" is displayed.

6) If customer has at least one security pledged to a secured non-purpose loan, "Pledged balance, $zzz,zzz, zz9.99", is displayed.

After all securities have been displayed, "Total portfolio value, $zzz,zzz,zz9.99" is displayed.

If at least one security is unpriced, a disclaimer, such as "Not including unpriced securities", is also displayed. The holdings screen also indicates that this action has been completed and prompts the user to indicate whether further actions are desired.

If the "quotes" option was selected from the "get information" menu, the process continues as shown in FIG. 8. First, it is determined whether trading is available as described above in FIG. 3. If not, the user may return to a previous options menu. If trading is available, it is determined whether the customer has reached a predetermined daily maximum number of quotes. For example, the system keeps track of the number of quotes obtained by the customer by updating an appropriate variable each time that quotation information is conveyed to the customer. If the maximum number of quotations has been reached, a message is displayed informing the customer of the maximum amount permitted and the customer is returned to an earlier menu. Otherwise, the system continues as shown in FIG. 8. This prevents a customer from tying up the CAT terminal.

If securities are available for sale, a "tell stocks symbol" screen is displayed. This screen prompts entry of up to five stock symbols, by displaying the header "please tell me the stock symbols." Each symbol correspondence to a particular security. As an added feature, the system also informs the customer that up to five quotes can be requested at a time. If the customer has fewer than five quotes (one to four) remaining, the header indicates "I can give you N more today" where N is the appropriate number of quotes remaining in the customer's allowance from 1 to 4. In this way, the customer is informed how many additional quotes are available.

The customer then enters the stock symbol of each security for which the customer desires to obtain a quotation. Preferably, this entry is input through a "keyboard" displayed on the touch screen input of the CAT. As shown in FIG. 8, the customer is also provided with the options of using the symbol directory to look up the appropriate symbol for a given security or of returning to our earlier options menu. If the customer wishes to consult the symbols directory, the process continues as shown in FIG. 9. Once the appropriate symbol for each security has been entered, the information corresponding to the selected securities are sent to the brokerage system, and price quotations are obtained. In obtaining quotations, the system determines whether a connection to the quotation service is currently available. If not, the system indicates to the customer that the service is unavailable, and the customer is returned to an earlier screen. If the service is available, a price quotation is provided to the customer. For example, information such as the daily high, the daily low, the last available price, the change from the previous day and the total volume of trading for each security may be provided. An example of the "here are quotes" screen referred to in FIG. 8 follows:

| Line | Text | Comments |
| --- | --- | --- |
| 2 | "Okay. There are your quotes" | |
| 4 | {Categories} | Symbol, plus, generally, "Day High; Day Low; Last; Change; and Volume (100s)"; |
| 6–7 (and following, if additional stocks) | 1st line<br>2nd line | Stock Quote data, if available;<br>If no data for a symbol, "I'm sorry. I can't find a quote for this symbol" |

As mentioned above, the customer is given the option of looking up a symbol for a particular security. For example, a "want symbol look-up" screen is displayed if the customer presses "ENTER" without having entered any stock symbols on the sell stock symbol screen. At this point, the system prompts "would you like to see the stock symbol directory." Selection of "yes" displays the symbol "look-up arguments" screen as shown in FIG. 9.

As illustrated in FIG. 9, the symbol look-up screen is displayed after: (1) selection of symbol directory from the "get securities information" screen; (2) selection of "let's start at another letter" from the symbol look-up list screen; or (3) selection of "YES" from the "want symbol look-up" screen in FIG. 8. The "symbol look-up argument" screen prompts entry of at least one, and at most 28 letters of a security's name using an alpha-numeric keyboard displayed on the touch screen of a CAT. Preferably, the ATM machine is programmed so that if a non-alphabetical character key is depressed, an error indication is provided, such as an audible tone. Once at least one letter has been pressed and an "ENTER" function key is pressed, a query is sent to the front end to look up a stored list of security names beginning with the entered letter(s). The system provides a symbol look-up list screen. If at least one exact match exists with the name entered, the first match is displayed followed by the next three listings. If no exact matches exist, the next closest name is displayed, followed by the next three listings.

The "symbol look-up list" screen displays up to four stocks (common and preferred) per screen, and includes full backward and forward scrolling capability for all stocks beginning with the name or name fragment entered by the customer. The display is in alphabetical order by security name, not by symbol. Once the symbol list has been displayed, the customer is given the option of inputting another request.

If another request is desired, the "symbol look-up arguments" screen is again displayed. On the other hand, if no additional request is required, the system determines the point from which the symbol look-up process was accessed. If accessed from the quotes menu, the process returns to the "tell stock symbols" menu shown in FIG. 8. If the system entered the symbol look-up menu from the stocks menu, the system returns to FIG. 5A. If the system entered the symbol look-up menu from FIG. 4, it is presumed that the customer has obtained the information requested and the process resumes at an appropriate conventional options menu.

Accordingly, FIGS. 4, 7, 8, and 9 demonstrate how holdings, quotes, and symbol look-up functions are available through the system. FIG. 10 (carried over from the activity in orders menu shown in FIG. 4), illustrates how activity in orders information can be displayed to the customer. This menu provides the customer with the option of determining any open orders, any trades awaiting settlement, or any recent activity. As shown in FIG. 10, the selection of one of these three options prompts the system to determine whether the customer has a brokerage account or multiple brokerage accounts as explained above in reference to FIG. 3. It also determines whether the brokerage provider is available as explained above. Once this information has been verified, the system proceeds with the open orders menu described in FIG. 11, the trades awaiting settlement menu described in FIG. 12, or the recent activity menu described in FIG. 13.

Figure 11:
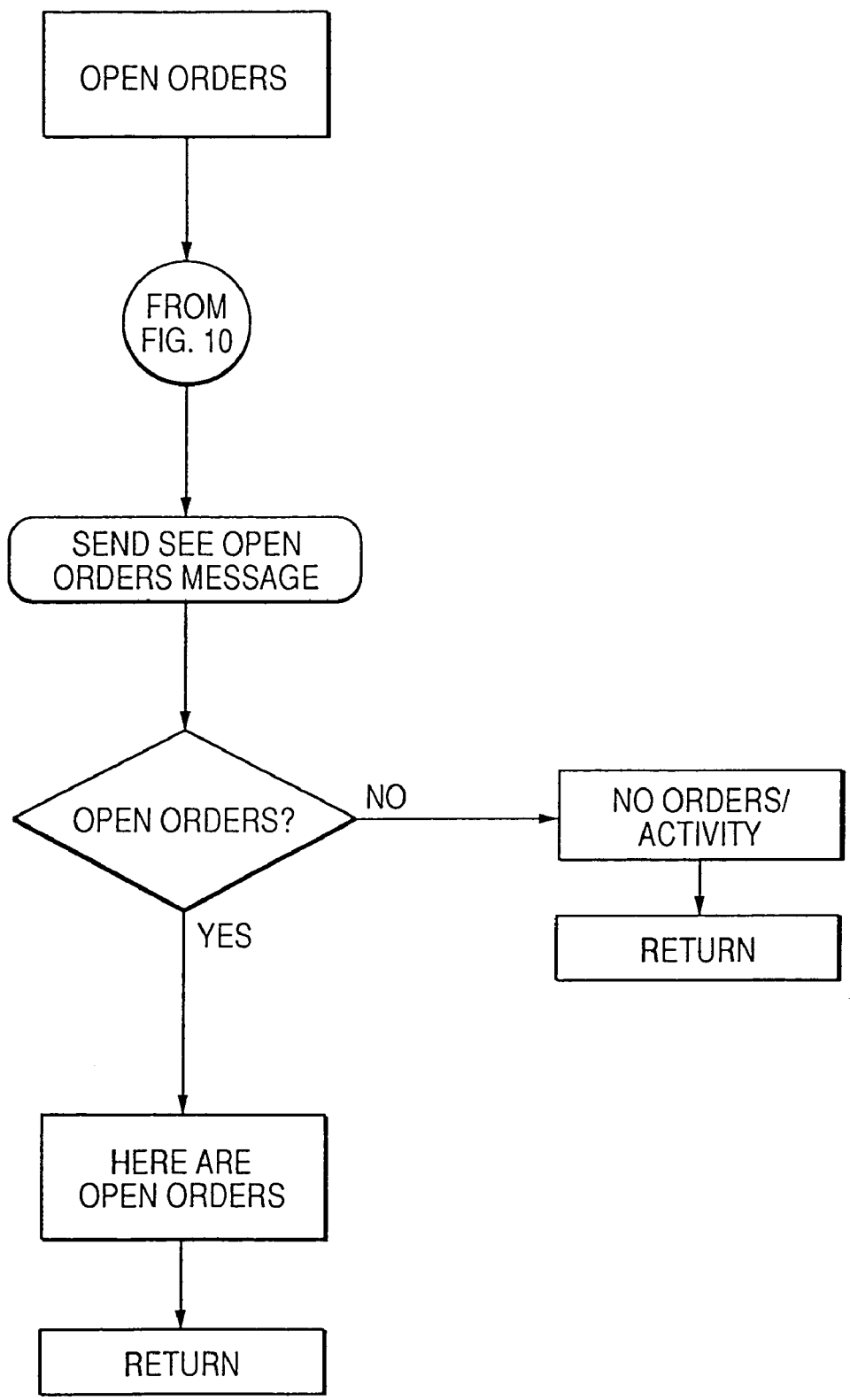
FIG. 11 is a flow chart illustrating a process for determining opening orders in accordance with a first embodiment of the present invention.

The "open orders" menu shown in FIG. 11 is displayed following selection of "open orders" from the orders and activity screen when at least one open order exists, including those initiated by other customer interface terminals apart from the ATM.

This menu permits the customer to receive information stored in a file maintained by CPS. This information keeps track of all orders placed and their status.

As shown, the open orders request is sent to the system which determines whether any open orders exist. If none exist, then the system returns to an earlier options menu. If open orders do exist, information relating to the orders is provided. For example, the system displays the type of order (buy, sell, buy to open, buy to close, sell to open, sell to close, margin buy, and margin sell), the size of the order, the name of the security, the type of security (for example, mutual fund or stock) whether the price of the security is at a predetermined limit, the duration of the order, the date the order was placed, whether the order has been partially executed, and any other qualifying information which may be appropriate. More particularly, as few as one open order and up to two orders may be displayed per screen. Expired, cancelled or killed orders may also be displayed. An exemplary screen indicating the open orders display follows:

| Line | Text or {SDE} | Comments |
| --- | --- | --- |
| 1–2 | "Here are your Open Orders (any order may have been executed)" | |
| N | {type of order}<br>{size of order} | 1st variable,<br>"buy", "sell",<br>"buy to open",<br>"buy to close",<br>"sell to open",<br>"sell to close", "short",<br>"exchange", "margin buy",<br>"margin sell";<br>2nd variable,<br>"Qty: zz,zzz,zz9.zzz"<br>(if not $ trans) or<br>$zzz,zzz,zz9.99<br>(if $ trans) |
| N + 1 (max through N + 4) | {Security Name}<br>XXXXXX | 1st variable, as transmitted:<br>for most securities,<br>X(30); for pref stock,<br>2•X(30); for mutual funds,<br>2•X(30; - for an exchange<br>of mutual funds, each fund<br>name displayed 2•X(30),<br>along with:<br>"From: [fund name]" and<br>"To: [fund name]" ;<br>for muni bonds, 4•X(30);<br>for T Notes/T Bonds,<br>X(30) + z9.999%<br>Due MM/DD/YY; for T Bills,<br>X(30) + Dated MM/DD/YY |

-continued

| Line | Text or {SDE} | Comments |
|---|---|---|
| | | Due MM/DD/YY<br>2nd variable:<br>"shares" if stock<br>or mutual fund;<br>otherwise suppressed |
| next line<br>(max to<br>N + 5) | {limit/stop info}<br>{order duration} | 1st variable, "at" +<br>limit price and/or stop<br>price (for stop-limits,<br>both limit and stop<br>price are displayed:<br>"at zz9.zzz stop zz9.zzz")<br>2nd variable, "Day order"<br>or "Good 'Till Cancelled"<br>(both variables/entire<br>line suppressed<br>unless limit, stop<br>of stop-limit) |
| next line<br>(max to<br>N + 6) | Order placed xxx z9"<br>{partial} | 1st variable, date placed<br>2nd variable,<br>"Order partially executed"<br>(2nd variable suppressed<br>unless partial)<br>(both variables/entire<br>line suppressed for<br>mutual funds) |
| next line<br>(max to<br>N + 9) | {Qualifier(s)} | As transmitted<br>(if any; maximum of 3):<br>Do not Reduce;<br>All or None;<br>Fill or Kill;<br>Immediate or Cancel;<br>With or Without;<br>Or Better;<br>Extended Session;<br>Not Held |
| next line<br>(max to<br>N + 10) | {Status} | As transmitted (if any):<br>Pending<br>order sent to the exchange<br>Cancellation request sent<br>to the exchange<br>Cancelled<br>Cancelled by exchange or<br>clearing broker<br>There's a problem.<br>Please contact xxxxxx<br>[SDE, consult]<br>Option expired<br>Order expired unfilled<br>Order will be placed when<br>the market opens<br>Order partially executed |

Once the open order screen has been displayed, the customer can opt to return to an appropriate options menu.

Figure 12:
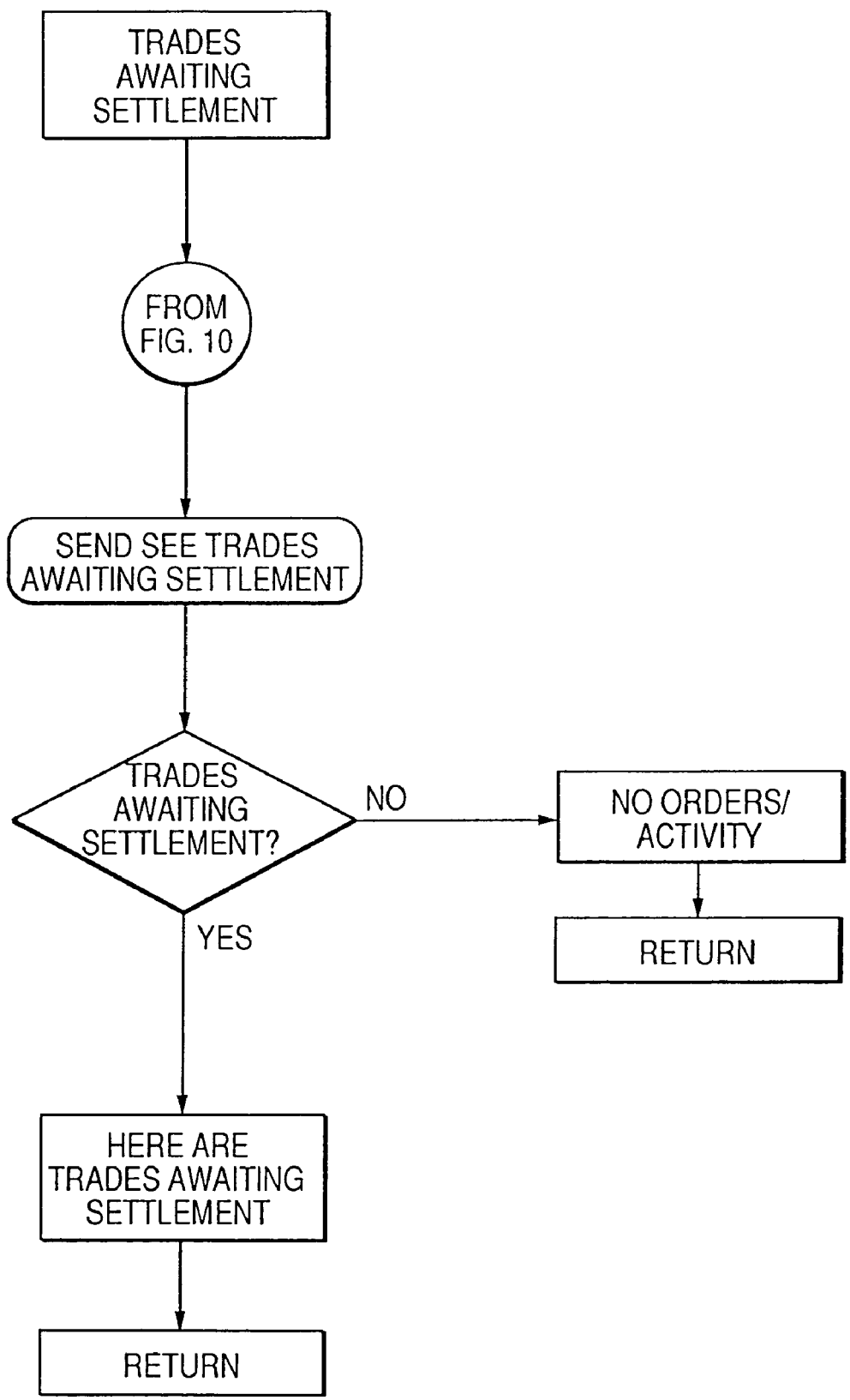
FIG. 12 is a flow chart illustrating a process for displaying trades awaiting settlement in accordance with a first embodiment of the present invention.

FIG. 12 describes a trades awaiting settlement display process. This process permit the user to receive information stored by the system to keep track of trades that have not yet been undergone settlement. As shown, a "here are trades awaiting settlement" screen is displayed following selection of "trades awaiting settlement" from the "orders and activity" screen when at least one executed order awaits settlement. This screen displays all trades awaiting settlement, including those initiated by means other than an ATM. As shown in FIG. 12, if no orders or activity exists, the customer is returned to an earlier menu. If trades awaiting settlement are available, the following information is displayed:

| Line | Text or {SDE} | Comments |
|---|---|---|
| 1 | "Here are your<br>Trades Awaiting<br>Settlement:" | |
| N | xxx z9<br>{type of order} | 1st variable, trade date;<br>2nd variable,<br>"Bought", "Sold",<br>"Bought to Open",<br>"Bought to Close",<br>"Sold to Open",<br>"Sold to Close",<br>"Shorted",<br>"Exchanged",<br>"Bought on margin",<br>"Sold on margin"; +<br>(if partial only),<br>"Partial" |
| N + 1<br>(Max<br>through<br>N + 4) | xxx z9;<br>{Security Name}<br>xxxxxx | 1st variable, trade date;<br>2nd variable, as transmitted:<br>for most securities,<br>X(30); for preferred stock,<br>2•X(30); for mutual funds,<br>2•X(30); - for an exchange of<br>mutual funds, each fund<br>name displayed 2•X(30),<br>along with:<br>"From: [fund name]" and<br>"To: [fund name]";<br>for muni bonds, 4•X(30);<br>for T Notes/T Bonds,<br>X(30) + z9.999% Due<br>MM/DD/YY; for T Bills,<br>X(30) + Dated<br>MM/DD/YY Due MM/DD/YY<br>3rd variable:<br>"shares" if stock<br>or mutual fund;<br>otherwise suppressed |
| next line<br>(max<br>through<br>N = 5) | "zz,zzz,zz9.zzz"<br>"at z,zz9,zzz"<br>$zz,zzz,zz9.99 | 1st variable, quantity;<br>2nd variable, unit price<br>(if security unpriced, display<br>"Unpriced" instead<br>of "at z,zz9.zzz");<br>3rd variable, security unpriced,<br>display "Unpriced"<br>instead of "Value:"<br>zz,zzz,zz9.99) |
| next line<br>(max<br>through<br>N + 7) | Commission:<br>$zzz9.99 | Commissions<br>(line suppressed if zero)<br>Note: SEC fees are not<br>displayed |
| next line<br>(max<br>through<br>N + 8) | | For Bond purchase or sale only,<br>"Accrued interest may have<br>been xxxxxxxx"<br>(charged; received)<br>otherwise, suppressed |

Figure 13:
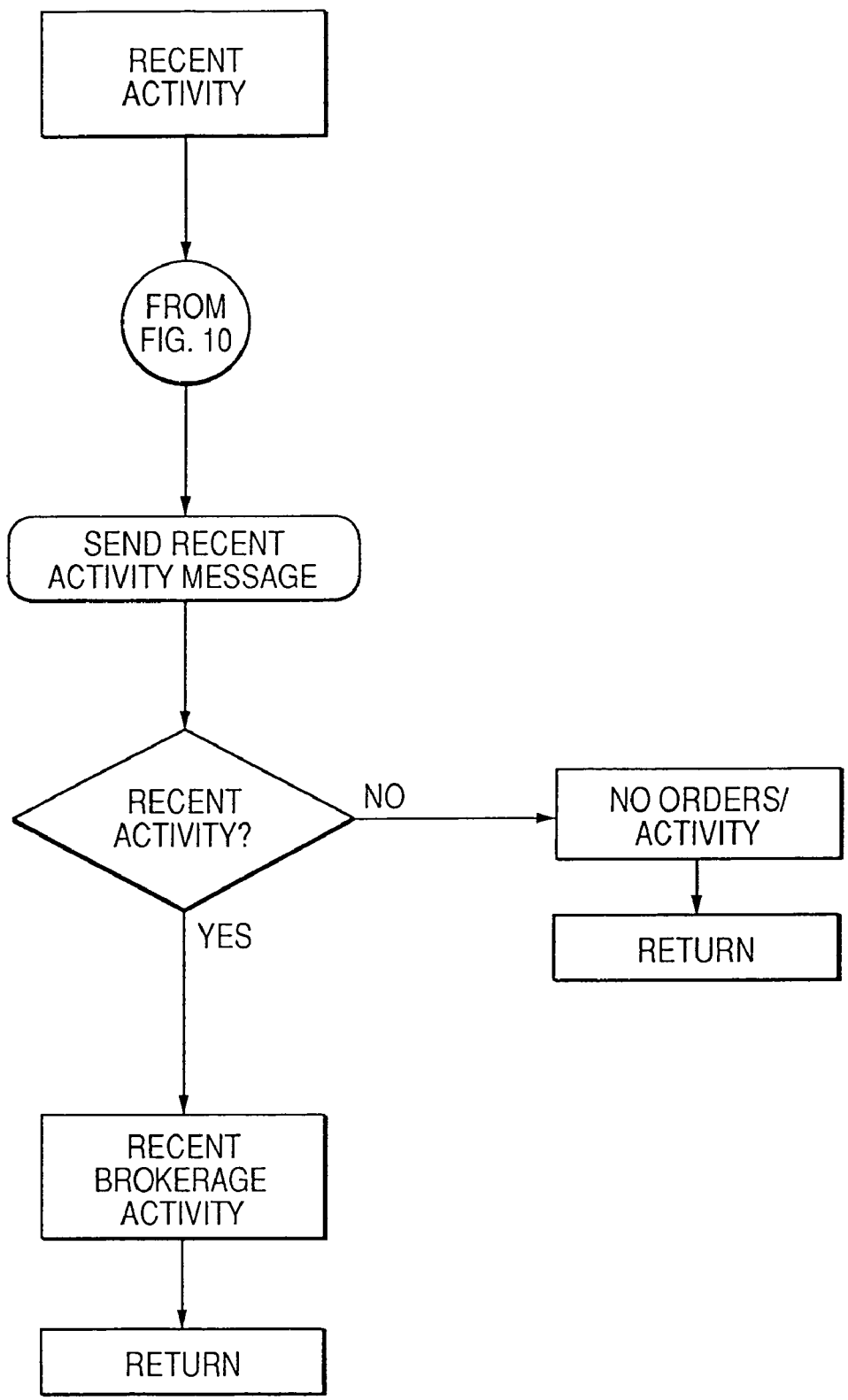
FIG. 13 is a flow chart illustrating a process for displaying recent activity in accordance with a first embodiment of the present invention.

FIG. 13 shows the recent activity menu which is available following selection of "recent activity" from the orders and activities menu in FIG. 10. As shown, a recent activity message is sent to the front end system which determines whether any recent activity exists over a predetermined period. If not, an appropriate message is displayed to the customer, and the customer has the option of returning an earlier menu. If recent activity does exist, the recent brokerage activity is displayed to the customer, for example, as follows:

| Line | Text or {SDE} | Comments |
|---|---|---|
| 1 | "Here is your<br>recent Brokerage<br>activity:" | |

-continued

| Line | Text or {SDE} | Comments |
|---|---|---|
| N | {date MMM DD} xxxxxxxxxxxxxxx | 1st variable, Settlement date, if a trade; otherwise, Posting Date 2nd variable, "Bought", "Sold", "Exchanged", "Bought on margin", "Sold on margin", "Interest", "Dividends", "Delivered", "Received", "Dividend Reinvested", "Journal Item" (Additional items may be transmitted to CAT and interpreted for display) |
| N + 1 (max through N + 4) | xxxxxxxxxxx MMM DD {Security Name} xxxxxx | 1st variable, "Trade date" MMM DD", displayed only if a trade; 2nd variable, as transmitted: for most securities, X(30); for preferred stock, 2•X(30); for mutual funds, 2•X(30); - for an exchange of mutual funds, each fund name displayed 2•X(30), along with: "From: [fund name]" and "To: [fund name]"; for muni bonds, 4•X(30); for T Notes/T Bonds, X(30) + z9.999% Due MM/DD/YY; for T Bills, X(30) + Dated NN/DD/YY Due MM/DD /YY 3rd variable: "shares" if stock or mutual fund; otherwise suppressed |
| Next two lines (max to N + 6) | zz,zzz,zz9.zzz xxxxxx at: $z,zz9.zzz xxx xxxxx | 1st variable, quantity; 2nd variable, "shares" (suppressed unless interest or dividend); 3rd variable, unit price (if security unpriced, display "Unpriced" instead of "at z,zz9.zzz"; suppress if delivered/received transaction) 4th variable, "per share" (suppressed unless interest or dividend). |
| Next line (max to N + 7) | Total: $zz,zzz,zz9.99 -or- {Accrued Interest} | Total transaction price (price × qty, plus or minus commission, as applicable) suppressed for Bond Trade For Bond purchase or sale only, "Accrued interest may have been xxxxxxx" (charged; received) |
| Next line (max to N + 8) | {Partial} | "Order Partially Executed" (display only if partial order) |
| Next line (max to N + 9) | Commission: $zz,zz9.99 | Commission Entire line suppressed if zero and for interest and dividends, for dividends reinvested, for delivered/received transactions, and for journal items Note: SEC fees are not displayed |

In this manner, the customer is given the option of obtaining various information pertaining to various securities transactions and/or securities prices, such as sales dates, amounts, and commissions.

As mentioned above in reference to FIG. 3, the customer may have requested to buy or sell stocks instead of requesting information. These processes are described respectively in reference to FIGS. 5A through 5D and 6A through 6C.

Figure 5A:
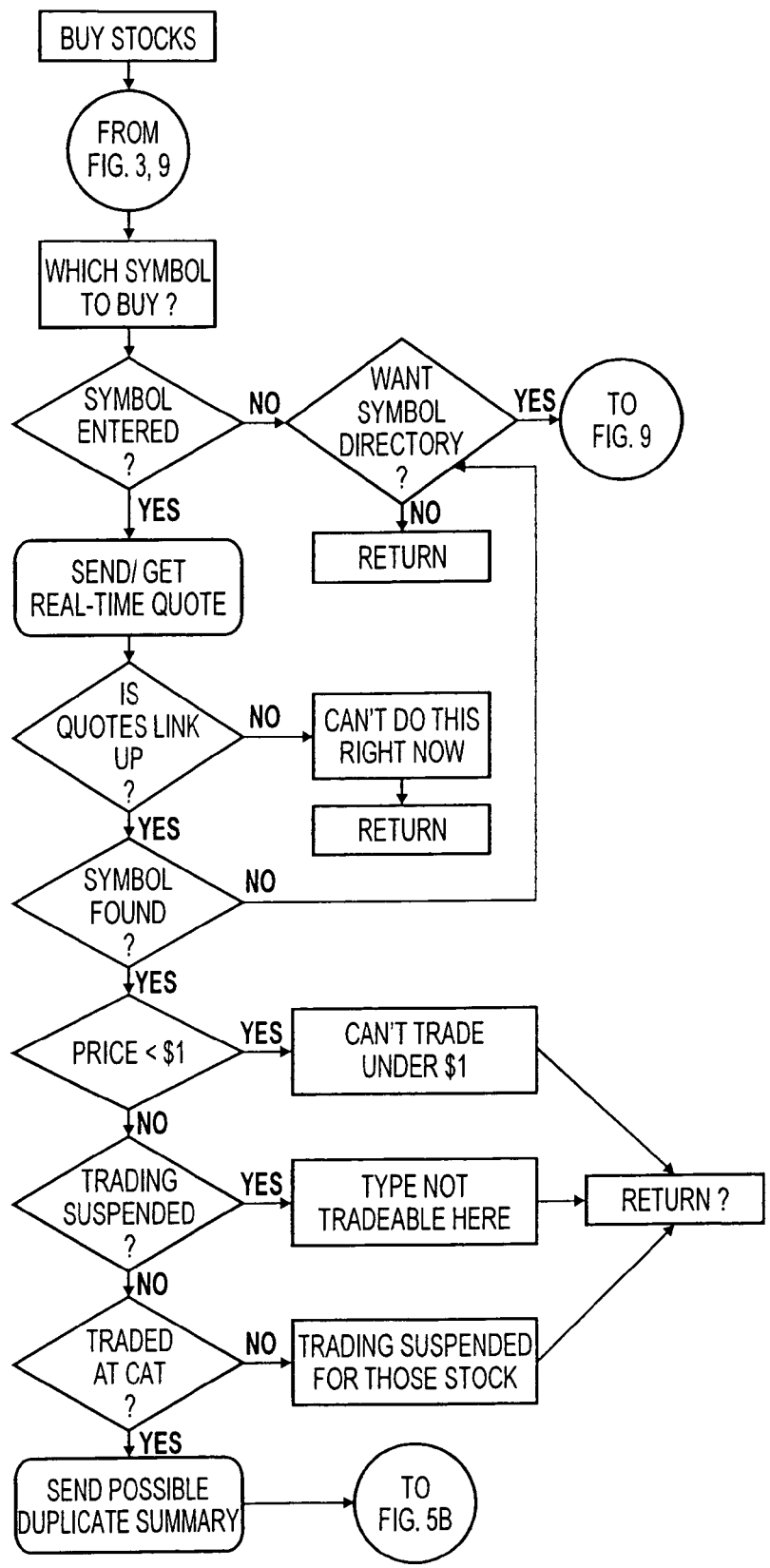
FIGS. 5A to 5D are flow charts illustrating a process for purchasing stocks in accordance with a first embodiment of the invention.
Figure 6A:
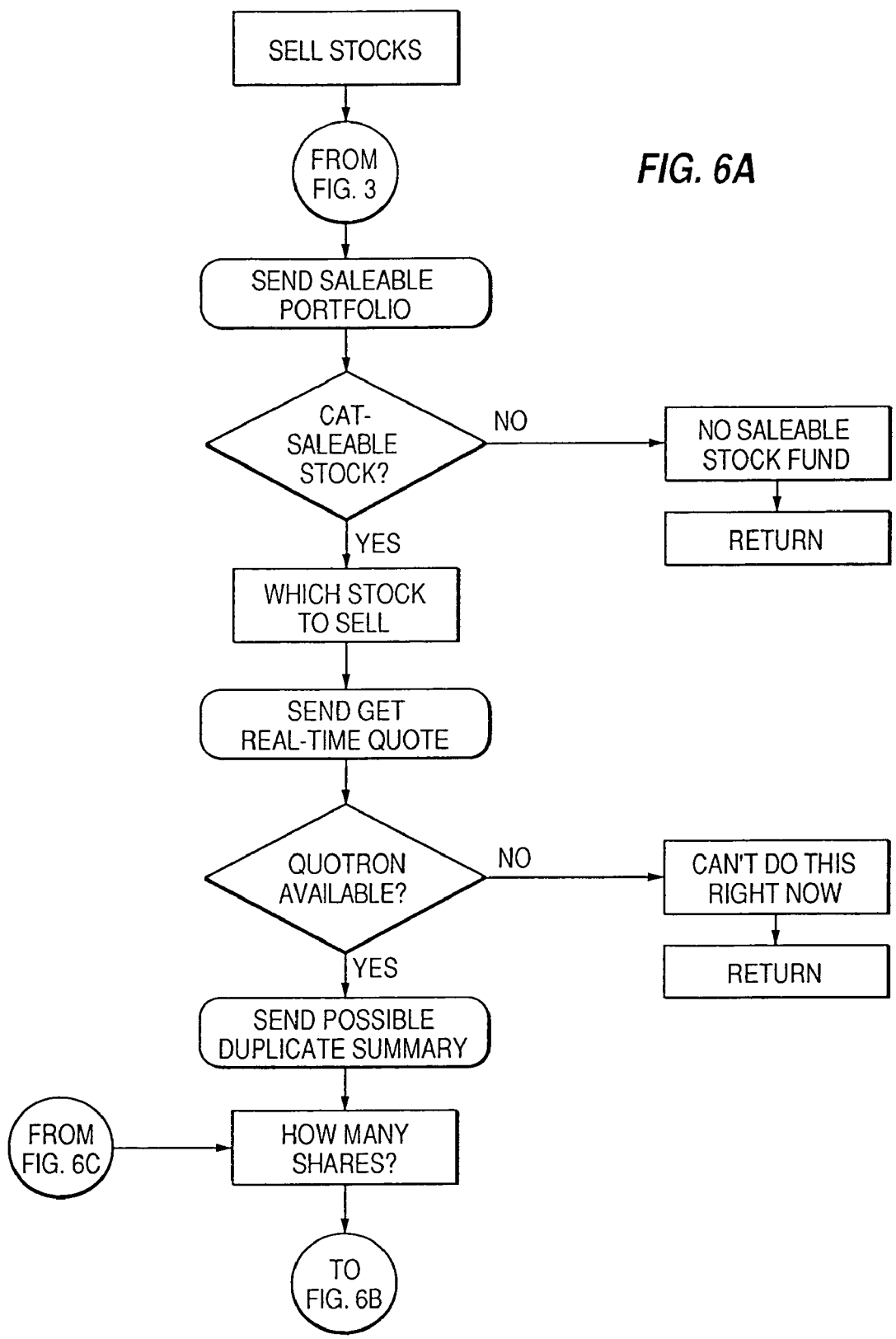
FIGS. 6A to 6C are flow charts illustrating a process for selling stocks in accordance with a first embodiment of the invention.
Figure 6B:
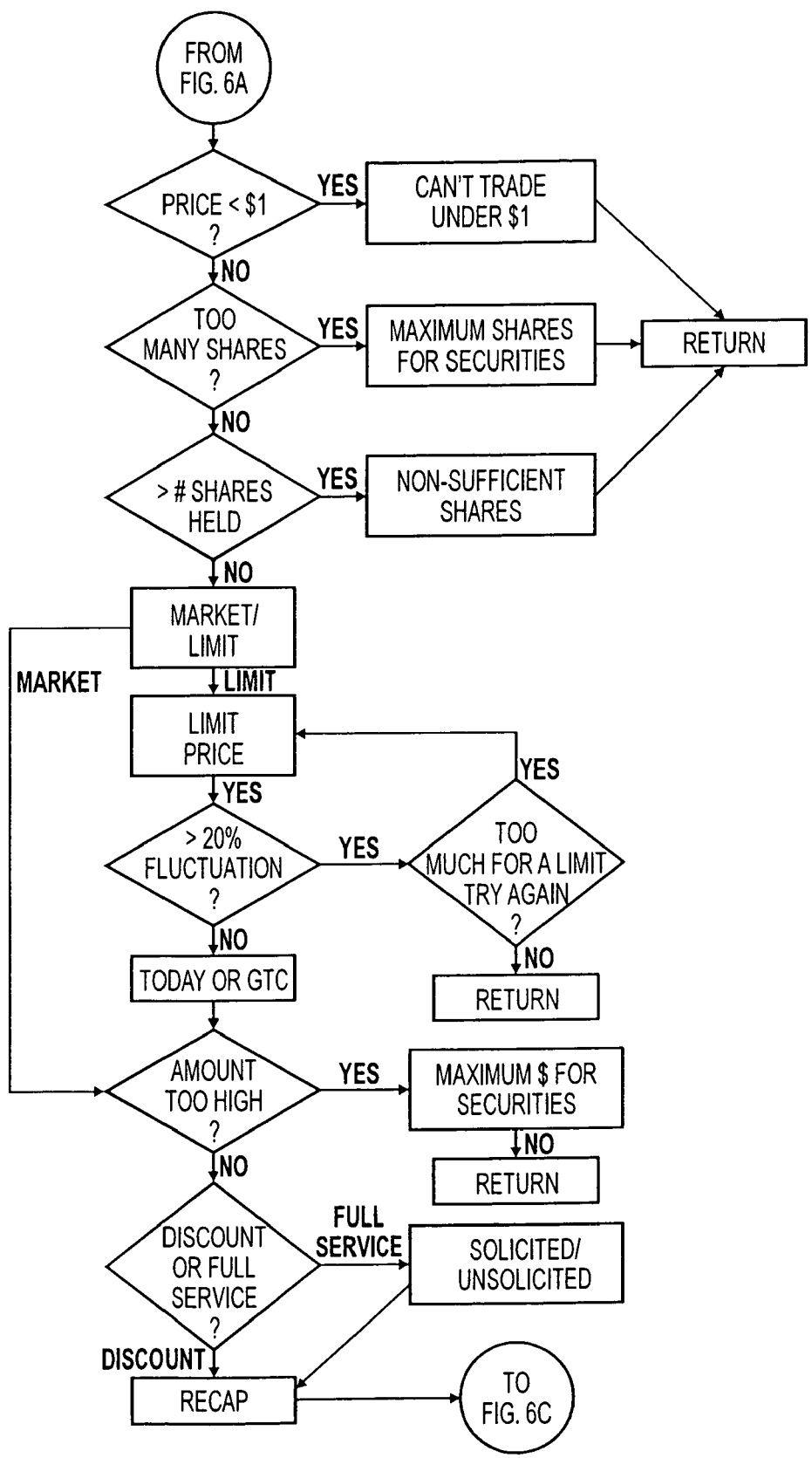
Figure 6C:
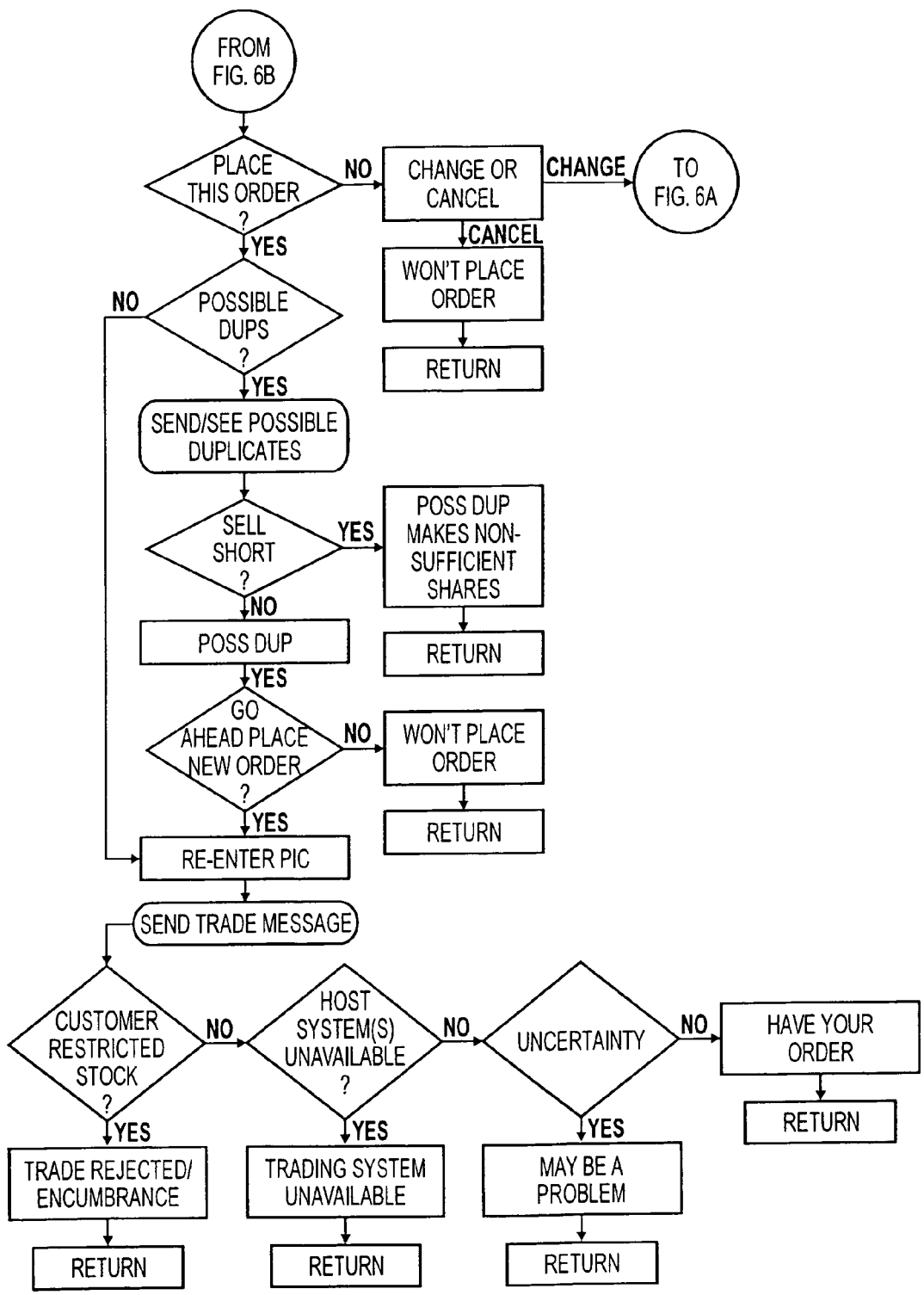

As shown in FIG. 5A, the selection of "buy stocks" from the securities menu of FIG. 3 displays a "which symbol to buy" screen. This screen prompts entry of a stock symbol of one to seven characters using a "keyboard" displayed on the CAT's touch screen. If no symbols are entered, the customer is given the option of selecting a symbol from the directory.

If the "select symbol" option is selected, the system implements the process described above in reference to FIG. 9. On the other hand, if a symbol is entered, the system looks up the symbol entered to determine which security is being requested for purchase, and then sends a request for current price quotation for that security. In doing so, the system first determines whether the quotation system is on-line. If not, a suitable message is displayed to the customer and the customer is returned to an earlier options menu. If the quotation system is operational, it is determined whether the symbol entered by the customer is recognized by the system. If not, the customer is given the option of using the symbol directory in accordance with the process described in FIG. 9. Once the appropriate symbol has been entered and the real-time quotation system is operational, a real-time quote is provided from the quotation system.

If the symbol entered by the customer corresponds to a stock whose latest available price is less than a predetermined amount, such as $1.00, the system displays a screen stating "I'm sorry . . . I can't accept trades of stocks priced under $1.00 per share here." The system preferably then displays a referral to a customer service representative for further assistance to the customer and returns the customer to an earlier option menu.

It is then determined whether the symbol entered by the customer corresponds to a stock or other type of security that cannot be traded with the system. If so, the system displays a message such as "I'm sorry . . . I can't handle purchases or sales of this class of stock here." Again, the system preferably displays an appropriate referral for the customer further assistance.

The system further determines whether trading has been suspended of the appropriate exchange. If trading has been suspended or if it has been restricted to certain activities, an appropriate message is displayed and the customer is returned to an earlier options menu. Similarly, the system determines if the requested security can be traded with the CAT.

Figure 5B:
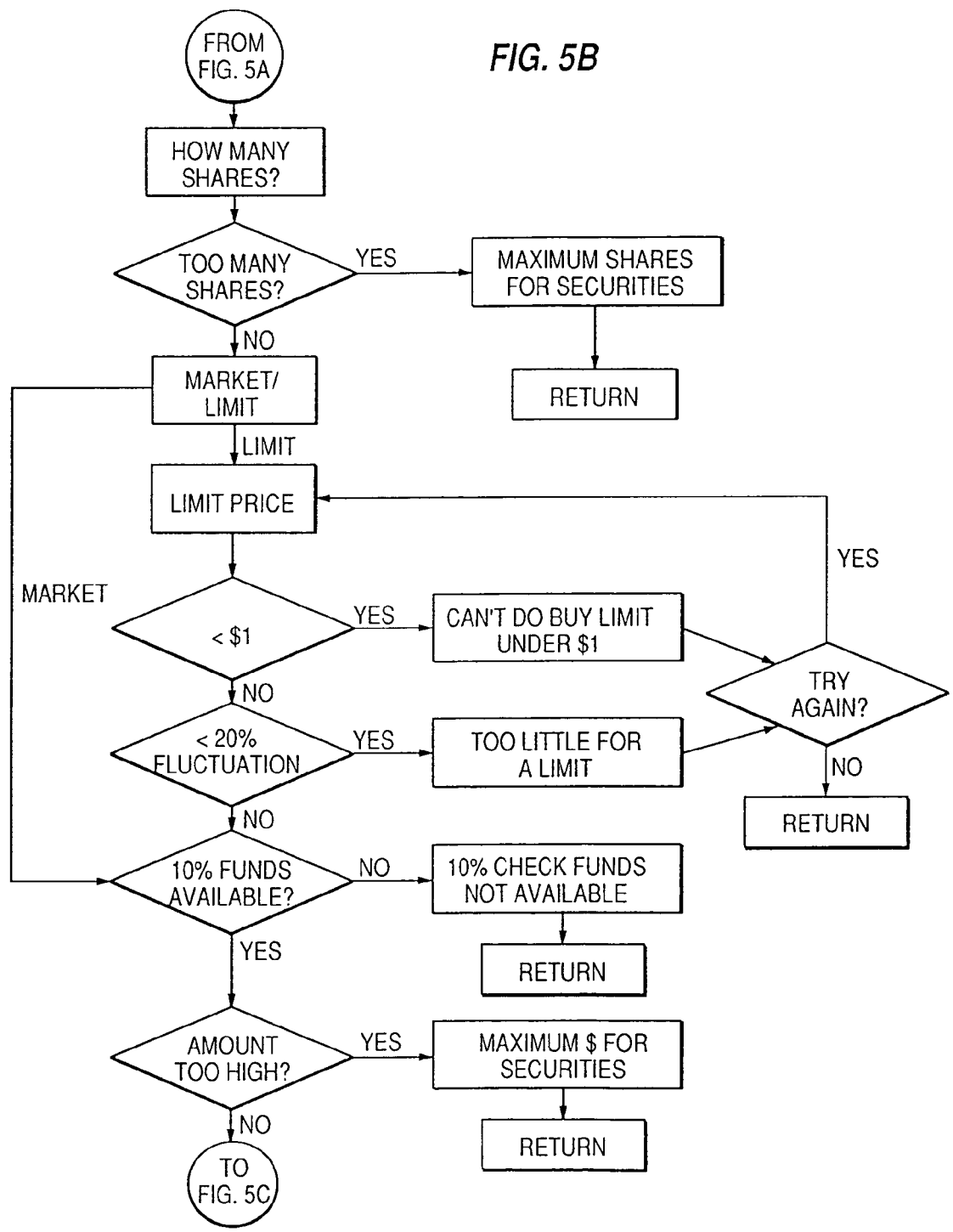
Figure 5C:
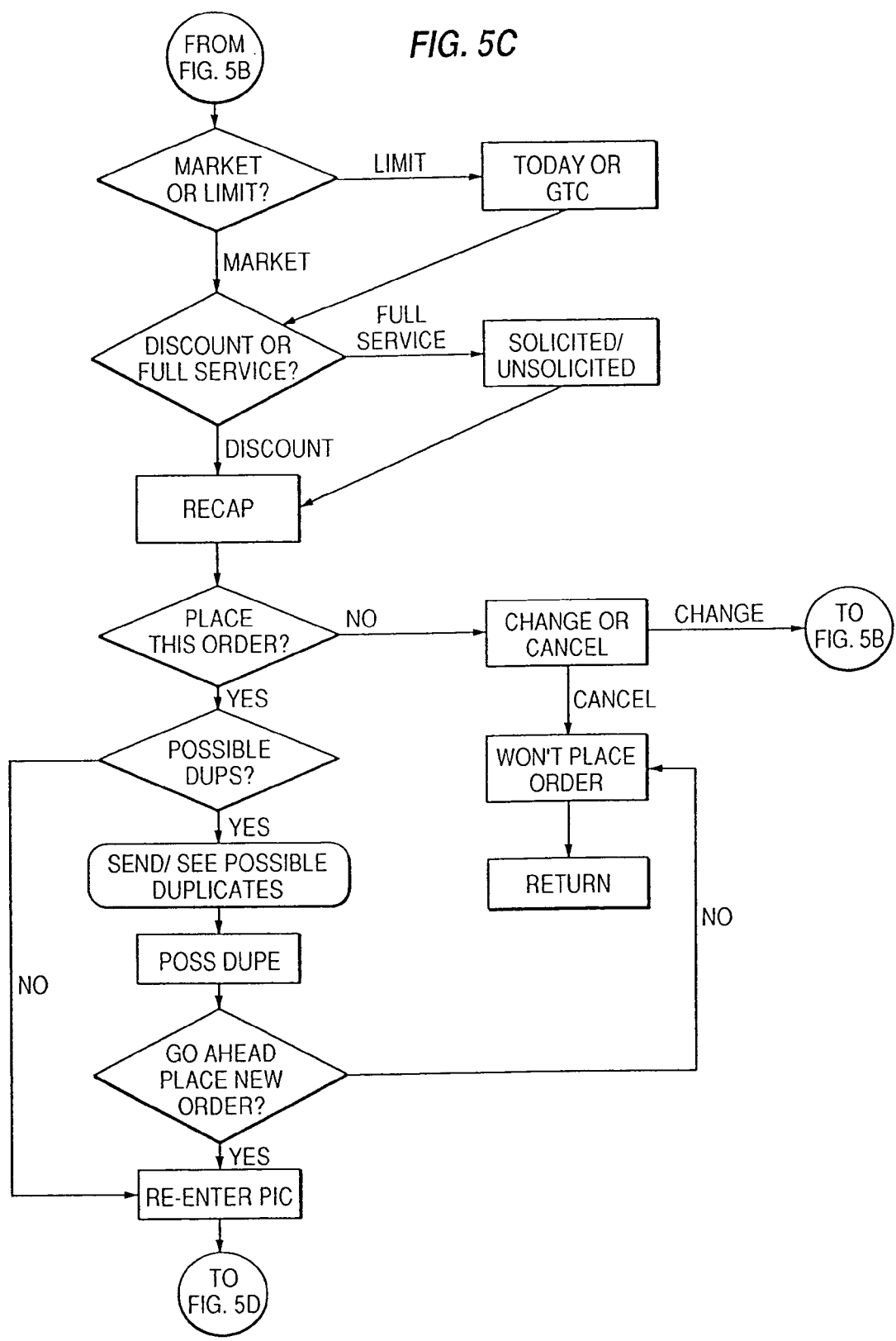

If the price is over the predetermined limit, trading is not suspended, and the requested security is available for trading with the system, an appropriate message is sent to the customer. The system requests how many shares the customer wishes to buy as shown FIG. 5B. At this point, the system checks to see if an entered number of shares to be bought is above a predetermined maximum shares. If so, the system displays the maximum number of shares permitted for trading and returns the customer to an earlier options menu to further proceed. If the entered number is less than the predetermined maximum number permitted by the system, a "market/limit" screen is displayed which states "how do you want to buy the shares" and displays one of two options—market or limit. The selection of a limit button displayed on the touch screen results in a "limit price screen"

described below. Selection of a displayed market button initiates various checks for order acceptability based on the following: total price (based on latest available price) in comparison with a predetermined amount; and (2) a check against the customer's brokerage account in order to determine whether the customer has funds available to satisfy the purchase. Alternatively, the system may determine whether the available funds within a predetermined range of the current price check is not applicable to the customer. If the order passes these checks, the system proceeds as shown in FIG. 5C The limit price screen of FIG. 5B is displayed following either selection of "limit" on the market/limits screen or selection "yes" on the too little for limit screen described below. The limit price screen displays numeric keypad which includes numeric keys and buttons corresponding to fractional share amounts, such as ⅛, ¼, ⅜, ½, etc. The customer is prompted to state a limit price. Once this limit price is input by the customer, the system determines whether the requested limit price is over a predetermined minimum amount, such as $1.00. The system then determines whether the limit amount is within an amount based upon a percentage difference from the current price. For example, it is determined whether the requested limit is within 20% of the current price. If not, the system displays an appropriate message stating that the limit is too low, and asks the customer is he or she wishes to try again later. If so, the customer is returned to the limit price menu. If not, the customer is returned to an earlier options screen.

If the limit amount is determined to be within the established parameters, the system checks whether the customer's account and the request meet the criteria described above with regard to a selection of the market key. Specifically, the system determines whether the customer's account contains funds sufficient to cover, for example, at least 10% of the requested purchase, and also determines whether both the number of shares and the total dollar amount of the purchase are above a predetermined maximum limit. If so, an appropriate message is provided to the customer and the customer is returned to an earlier options menu. Otherwise, the system continues as shown in FIG. 5C.

As shown in FIG. 5C, if a limit option was selected by the customer, a "today or GTC" screen is displayed. This screen queries the customer as to the length of time the customer desires the order to be in effect. The customer is given the options of "today only" or "good 'til order cancelled" (GTC). The latter option permits the customer to specify a future date at which the order will be cancelled if it has not previously been performed. Upon selection of either option, or if the customer has previously selected the "market" option, the system preferably determines whether the customer is provided discount service or full service. If the customer has a full service account, the system asks the customer whether an investment consultant recommended the purchase. The customer's answer is logged for internal use and a "stock recap" screen is displayed.

The stock recap screen is displayed after selection of either the "limit" or "market" options. This screen displays the following text:

| Line | Text or {SDE} | Comments |
| --- | --- | --- |
| 1 | "Okay, here's the order I have for you" | |

-continued

| Line | Text or {SDE} | Comments |
| --- | --- | --- |
| 4 | xxxx: zz,zzz,zz9 shares | variables, "Buy" or "Sell", and the number of shares |
| 5 | "of:" 2•X(30) | variable, the stock name |
| 7 | "Symbol:" xxxxxx | variable, the symbol symbol |
| 8 | "As follows:" xxxxxxxx | variables, "At Market" or "Limit" and limit price if "Limit" |
| next line | xxxxxxxxxxxxxxx | variable, "Day Order" or "Good till cancelled" (suppressed unless Limit Order) |
| next line (max 10) | {Solicited} | If Full Service customer and solicited = "yes", display "I.C. Recommended"; otherwise, suppress |

Once the screen is displayed, the system asks the customer whether to go ahead and place the order. Selection of "no" in response to this message displays a change or cancelled screen.

The change of cancelled screen is displayed after selection of "no" on the stock recap screen. It provides the customer the option of either changing the order or cancelling the order. Changing the order discards all order information except for the security name and returns the customer to the "how many shares" screen. Selection of a "cancel order" option discards the order and causes the display of a "won't place the order" message. The customer is then returned to an earlier option menu. If the customer indicates that the customer wishes to place the order, the system sends the order out for final edit checking. If the order passes various host error checks described below and the information is successfully returned to the ATM, the "have your order" screen is displayed as described below. This screen notifies the customer that the order has been transmitted for placement by the brokerage service provider. If the order fails any error checks or fails to transmit, an "exception to screen" is displayed.

The first error check implemented by the host system determines whether the customer's order is a possible duplicate. To perform this operation, the system checks the open orders and trades awaiting settlement information as described above. The possible duplicate screen recaps the previous open orders/trade and displays all information provided on either the "here are open orders" or "here are trades awaiting settlement" screens described above. If more than one possible duplicate order exists, the possible duplicate screen gives the customer the option of continuing through each duplicate which has been found. Once all possible duplicate orders have been reviewed by the customer, the system asks whether it should go ahead with the new order. If the customer responds affirmatively, the process continues. If the customer selects "no" the system displays the "won't place" order screen and returns the customer to an earlier options menu.

The next error check performed by the system verifies the customer's personal identification code (PIC). Specifically, the customer is prompted to re-enter his or her PIC in order to proceed with the transaction. The system consults which cross references the customer's PIC with the information previously provided b the customer to ensure that this information matches. Once a valid PIC has been accurately entered, the system continues as shown in FIG. 5D.

Figure 5D:
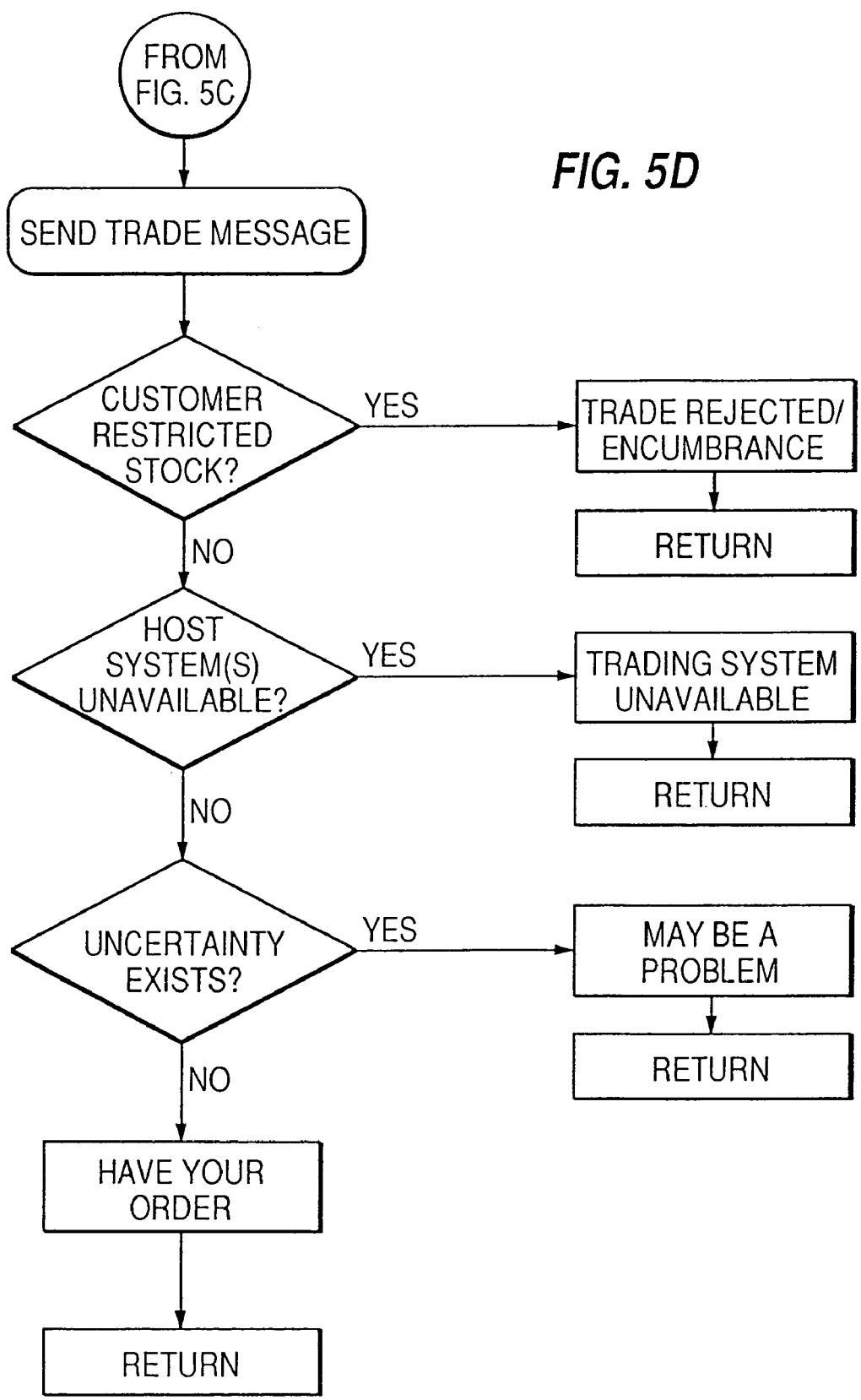

As shown in FIG. 5D, a "send trade" message is sent once the aforementioned error checks have been performed by the system. This prompts the system to determine whether the customer has first selected a security which has previously been deemed to be restrictive. If so, the trade is rejected and the customer is returned to an earlier options menu. If not, the system determines whether the host brokerage system is available. If it is unavailable, an appropriate message is displayed and the customer is returned to an earlier options menu. If the system is available, the process continues by determining whether there is any uncertainty as to the probability that the order will successfully go through. If so the customer is provided with an appropriate message and then returned to an earlier option menu. If no uncertainty is determined at this step, the order is placed and a confirmation is provided to the customer. The customer then may return to an earlier options menu.

In this manner, the customer may conveniently place purchase orders for immediate purchase or at a predetermined price. These options are conveniently provided to the customer through an existing platform in conjunction with several safeguards designed to ensure both that the trade will go through as requested and that the customer has sufficient funds to cover the transaction.

The "sell stocks" option is described in FIGS. 6A to 6C. As shown, the selection of a "sell stocks" option from the securities menu screen displays a "which stock to sell" screen once the system has determined which currently tradeable stocks are held in the customer's brokerage account. Specifically, the system sends the information corresponding to the customer's saleable portfolio and the system determines whether it is saleable over the ATM network. If not, a "no saleable stock found" message is provided to the customer and the customer is returned to an earlier options menu.

If the customer does have a saleable stock, the "which stock to sell" menu prompts the customer to select one of the saleable stocks. The system also displays the most recent price of the stocks which are saleable. Specifically, the system sends a request for a real time quote and determines whether the quotation service is available. If not, a message is displayed indicating that the system cannot perform a "sell" transaction and the customer is returned to an earlier options menu. The system performs various error checks such as those described above in reference to the "buy stock" option. Specifically, the system sends a possible duplicate summary and then displays a "how many shares" menu.

As shown in FIG. 6B, the process continues by determining whether the price of the stock which the customer wishes to sell is less than a predetermined amount, such as $1.00. If so, the system displays a "can't trade under $1.00" message and returns the customer to an earlier options menu. The system further determines whether the number of shares entered is greater than a predetermined maximum number of shares. If so, a maximum share number is displayed to the customer and the customer is returned to an earlier options menu. If the requested amount is below the maximum limit, it is determined whether the number of shares that the customer wishes to sell is above a minimum number. If an insufficient number is requested, the customer is returned to an earlier options menu. If the number of shares is above the minimum and meets the previously described criteria, the system displays a "market limit" screen. This screen asks the customer "how do you want to sell the shares" and prompts the customer to select either a "market" button or a "limit" button. Selection of the "limit" button results in display of the limit price screen. Selection of the "market" button initiates edit checks for order acceptability based on criteria described below.

The limit price screen provides the customer with the option of inputting a desired price at which the customer wishes to sell the selected security. Specifically, the CAT displays a numeric keypad which includes fractional dollar amounts such as ⅛, ¼, ⅜, ½ and so forth. The system prompts the customer to enter a limit price using this display. Once the customer has entered a limit price the system determines whether the price is within a predetermined fraction of the current security value. For example, if the limit is 20% greater than the current price the system displays a "too much for a limit" screen. This notifies the customer that the limit price for purchase can be no more than 20% above the latest available price. It indicates the latest available price to the customer as well as the maximum amount for the limit value. The customer is then given the option of trying again or returning to an earlier menu.

Once the 20% fluctuation limit has been met, a "today or GTC" screen is displayed. This screen asks the customer how long he or she desires to keep the order in effect. For example, the customer is given the option of indicating "today only" or "good until cancelled".

If a limit option had been selected and a limit price has been entered which meets the above-described criteria, or if a market option has been selected, the system determines whether the requested amount is too high. If the dollar value of the sale is above a predetermined limit then an appropriate display is provided to the customer informing the customer that the requested amount exceeds the limit. For example, the screen might read, "I'm sorry. I can't do that. The maximum daily sale of the single stock for the system is $50,000 up to 5,000 shares." Preferably, a referral to a customer service agent is then provided to the customer, and the customer is returned to an earlier options menu.

If the amount requested is determined to be within established parameters, the system determines whether the customer has a full service or discount account. If the customer has a full service account, the customer is asked whether the transaction was requested as a result of a consultant's advice. This information is recorded for internal auditing purposes. If the customer has a discounted account or the customer has responded to the "solicited/unsolicited" menu, the stock recap screen is displayed. An example of this screen is described above in reference to FIGS. 5A through 5B. Once the stock recap screen has been displayed, the process continues as shown in FIG. 6C.

As shown in FIG. 6C, once the stock recap has been displayed the customer is asked whether or not to place the order. If the customer indicates not to place the order, the customer is asked whether to change or cancel the order. If the order is cancelled, this request is confirmed and the customer is returned to an earlier options menu. If the customer wishes to change the order the system returns to the "how many shares menu. If the customer confirms that it is desired to place the order then the system checks for possible duplicates in a manner similar to that described above in reference to the "buy shares" option.

For example, the system checks if there are any possible duplicates based on the duplicate summary provided by the system as shown in FIG. 6A. If any possible duplicates are shown, they are displayed to the customer with the ATM screen. The system determines whether the requested order and the previously requested orders which have not gone through together are greater than the number of shares held by the customer. If so a "possible duplicate makes non-sufficient shares" screen is displayed. This screen reads, for example, "I am sorry . . . I can't accept this order. You have other orders outstanding for some or all of these shares." The customer is then returned to an earlier options menu.

If the customer has sufficient shares to cover the newly-requested transactions, a "possible duplicates" screen is displayed. This screen recaps previous "open order/trade awaiting settlement" request, displaying all information provided on the "here are open orders" screen or "here are the trades awaiting settlement" screen which are displayed in response to the "get information" option.

Once this information has been relayed to the customer, the customer is asked whether to go ahead and place a new order. If the customer indicates not to place a new order, a confirmation message is sent to the customer, and the customer is returned to an earlier options menu. If the customer confirms that a new order is desired, the customer is asked to re-enter his or her PIC. Once the customer's PIC is correctly re-entered, a "send trade" message is sent to the brokerage system.

At this point the system determines whether the security which the customer has requested to be sold is restricted, whether the host system is available, and whether any uncertainty exists as to the likelihood that the transaction will proceed. For example, as shown, if the stock is determined to be restricted a "trade rejected due to encumbrance" message is displayed. If the host system is unavailable, a "trading system unavailable" message is displayed. If any uncertainty exists, a "may be a problem" is displayed. If any of these errors occur, the customer is returned to an earlier options menu.

If no problems occur, the customer's "sell" order is confirmed. The customer is then returned to an earlier options menu for further actions.

In accordance with this method, a customer may obtain current securities price information and current portfolio value, buy securities and/or sell securities without directly contacting a broker. The customer may further obtain standard banking functions such as balance inquiries, transfers, deposits and withdrawals, all at the same location. The system according to the invention thus provides most standard brokerage functions within an environment already familiar to the customer.

2. Second Embodiment (FIGS. 16–21)

A second embodiment of the invention is now described with reference to FIGS. 16 to 21. As set forth in more detail below, this system permits a customer not only to trade stocks and bonds through an ATM network, but also to perform functions relating to mutual funds. More specifically, the system keeps track of the following information: the status of a particular fund, for example, whether it is open to all purchasers or only to current holders; the availability of more than one fund in a fund family; the existence of any exchangeable sub-group of funds in a fund family; any breakpoint of a fund and the amount; any minimum amount for first time purchases, IRA purchases, or any higher minimum amount set by the broker system; load information, such whether any front end or back end loads exist; any maximum transaction fees for purchase, redemption or exchange of no load funds; any redemption fees for front end load funds; any redemption restrictions; any promotions available on purchases and, if applicable, the promotion start and end dates; the availability of any hourly trading; any per day fund purchase maximum, and if applicable, the amount; and the minimum amount of in a customer's account in order to make a purchase. This information is maintained in records stored in a front end system and/or a brokerage system. Data elements representing this information is transmitted between these systems and to a customer using a CAT. These features and others are made apparent from the following description.

Figure 16:
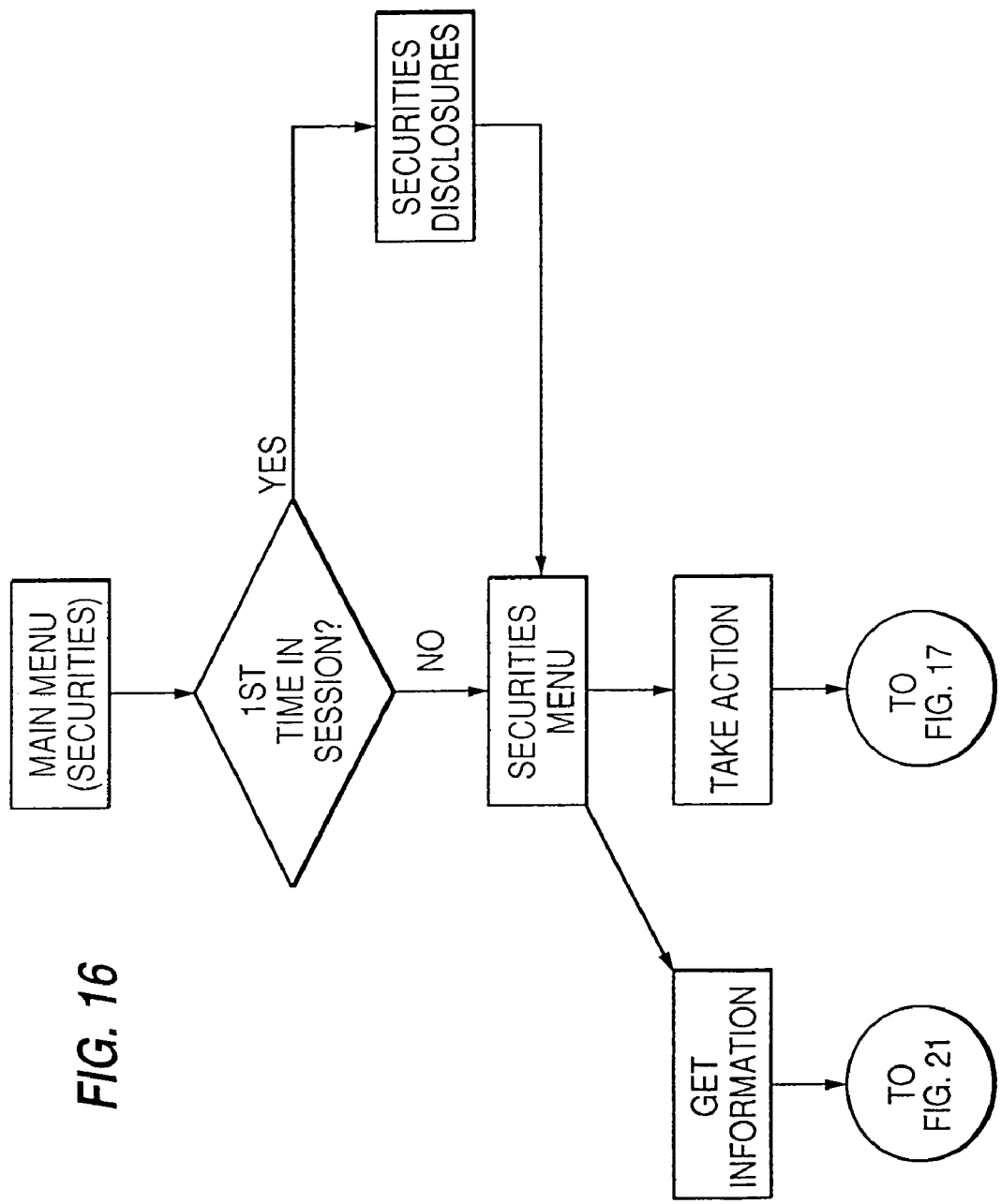
FIG. 16 is a flowchart illustrating a second embodiment of the invention.

FIG. 16 is a top-level flowchart for accessing a "securities" option in accordance with the second embodiment of the invention. As shown, the system determines whether it is the customer's first time accessing the securities option in a particular session. If so, a securities disclosure screen is provided to the customer in a manner similar to that described with regard to FIG. 3. The customer then is provided a securities menu, which instructs the customer to either "get information" or to "take action". The "get information" process is described below with reference to FIG. 21. The "take action" process continues as shown in FIG. 17.

Figure 17:
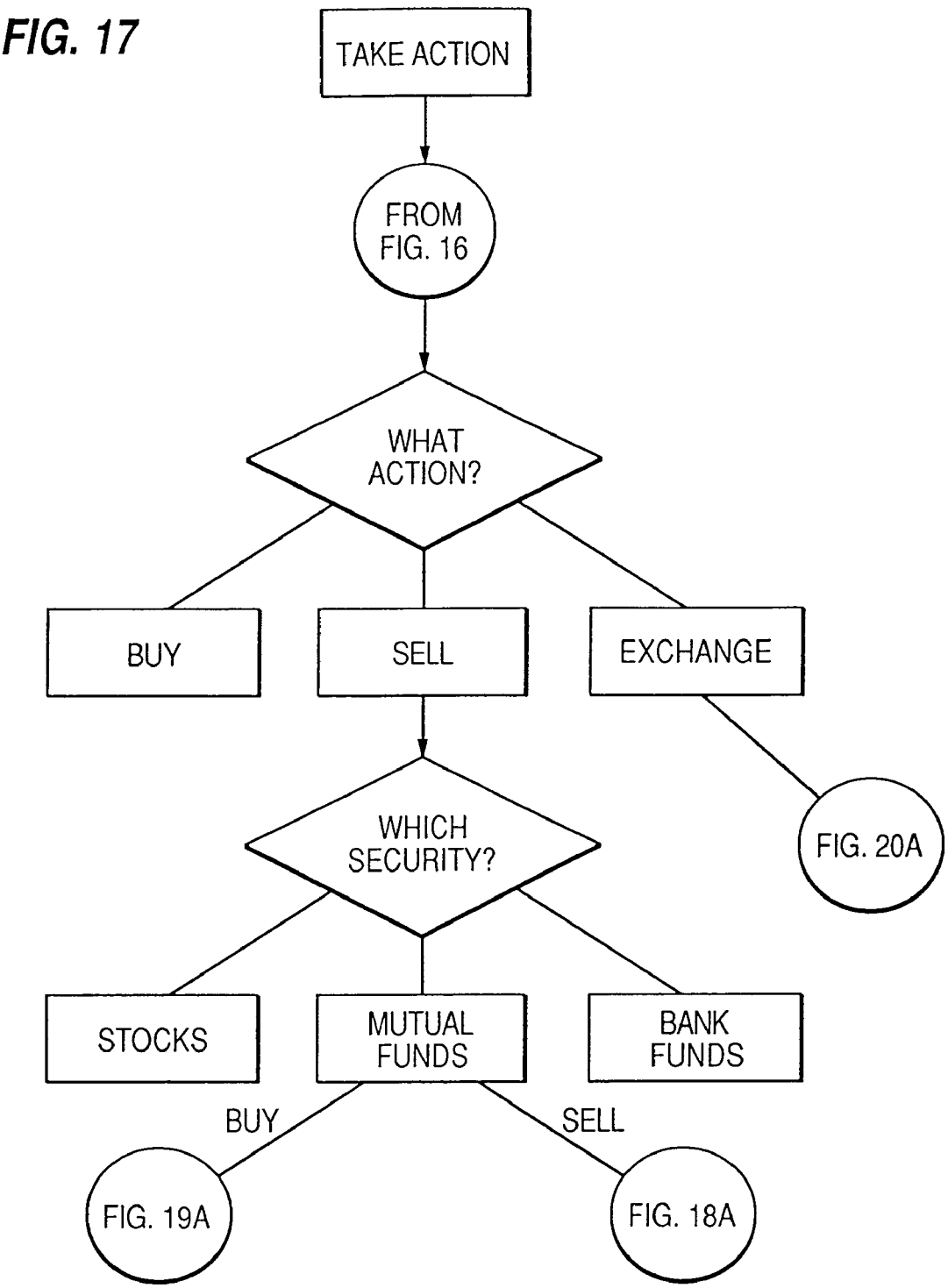
FIG. 17 is a flowchart illustrating a "take action" process according to the second embodiment of the invention.

As shown in FIG. 17, the user is given the option of selecting one of three options: a "buy" option, a "sell" option, and an "exchange" option. The exchange process continues as described below in reference to FIG. 20A. If either the "buy" or "sell" options are selected, the system determines which type of security the customer wishes to buy or sell. Specifically, the customer is given the option to buy or sell stocks, mutual funds, or funds offered through a company affiliated with the bank (that is, a family of funds from an affiliated company). The latter option involves a process similar to the one referred to in the background of the invention. Selection of the first option, that is, the selection of trading stocks, results in a process similar to that described in reference to FIGS. 5A–5D and 6A–6C of the first embodiment of the invention. The process for selling mutual funds is described in reference to FIGS. 18A and 18B, and the process for buying mutual funds is described in reference to FIGS. 19A and 19B.

Figure 18A:
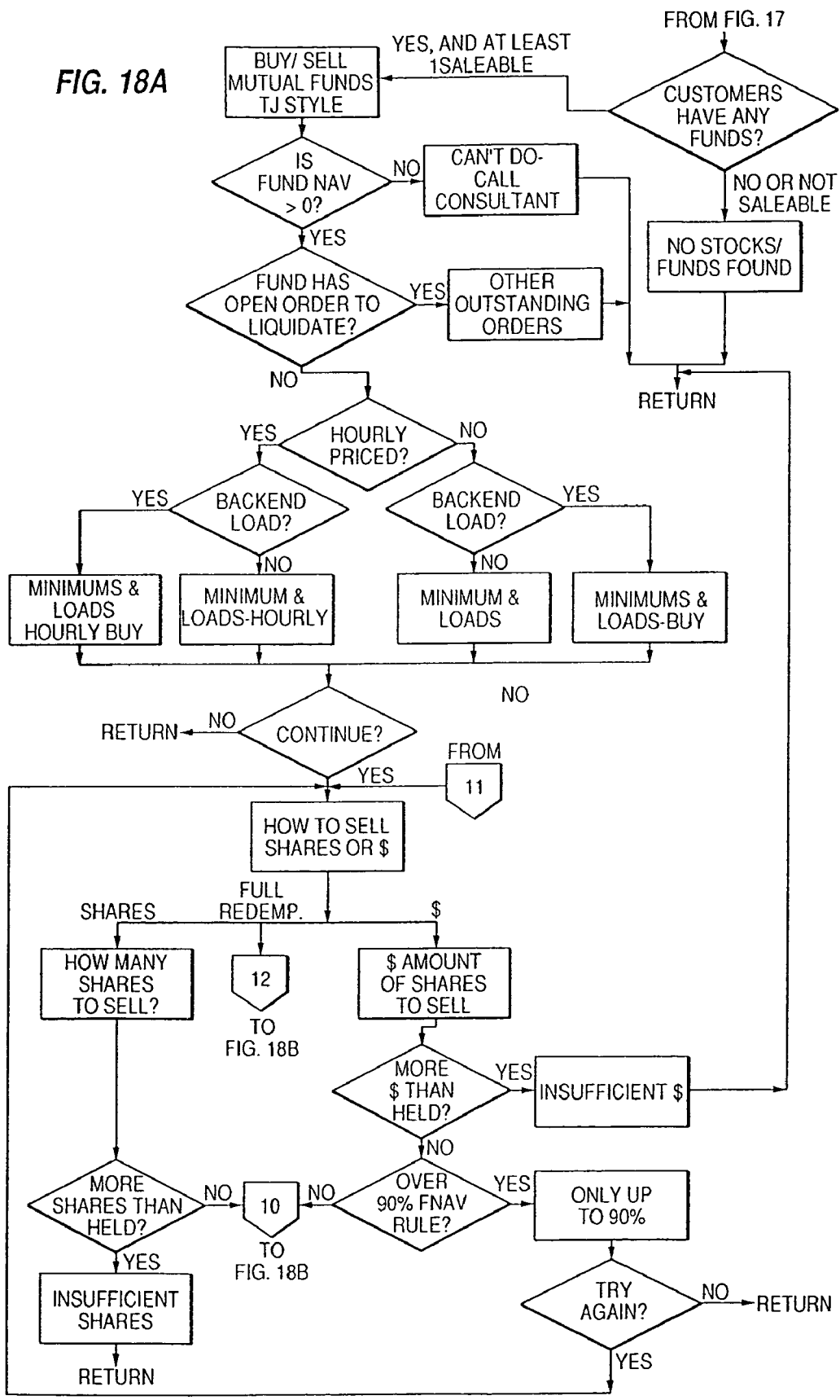
FIGS. 18A and 18B are flowcharts illustrating a process for selling mutual funds in accordance with a second embodiment of the invention.

As shown in FIG. 18A, the process for selling mutual funds according to this example first involves determining whether the customer has any mutual funds in his or her brokerage account. If not, a "no stocks or funds found" screen is displayed to the customer and the customer is given the option to return to an earlier options menu. If the customer does have at least one saleable fund, the system displays all saleable funds that are available and prompts the user to select which fund to sell.

Based on this selection, the system determines whether the NAV of the fund is greater than zero. If the NAV is not greater than zero, the customer is informed that the transaction cannot proceed and is prompted to call an investment consultant. If the NAV is greater than zero, the system determines whether the fund has an open order to liquidate. If so, the customer is informed of the other outstanding orders and then is given the option of returning to a previous options menu.

In this example, the system then determines whether the selected fund is hourly priced and whether the fund has a back-end load associated with it. The system then displays the price to sell the fund as of the last market close, and informs the customer that the actual sale price may fluctuate. If there is a back-end load associated with the fund, the system displays the minimum amount necessary to cover the charge up sale of the selected fund. Once provided with this information, the system prompts the customer whether or not to continue with a sales transaction. If not, the customer may return to an earlier options menu.

Figure 18B:
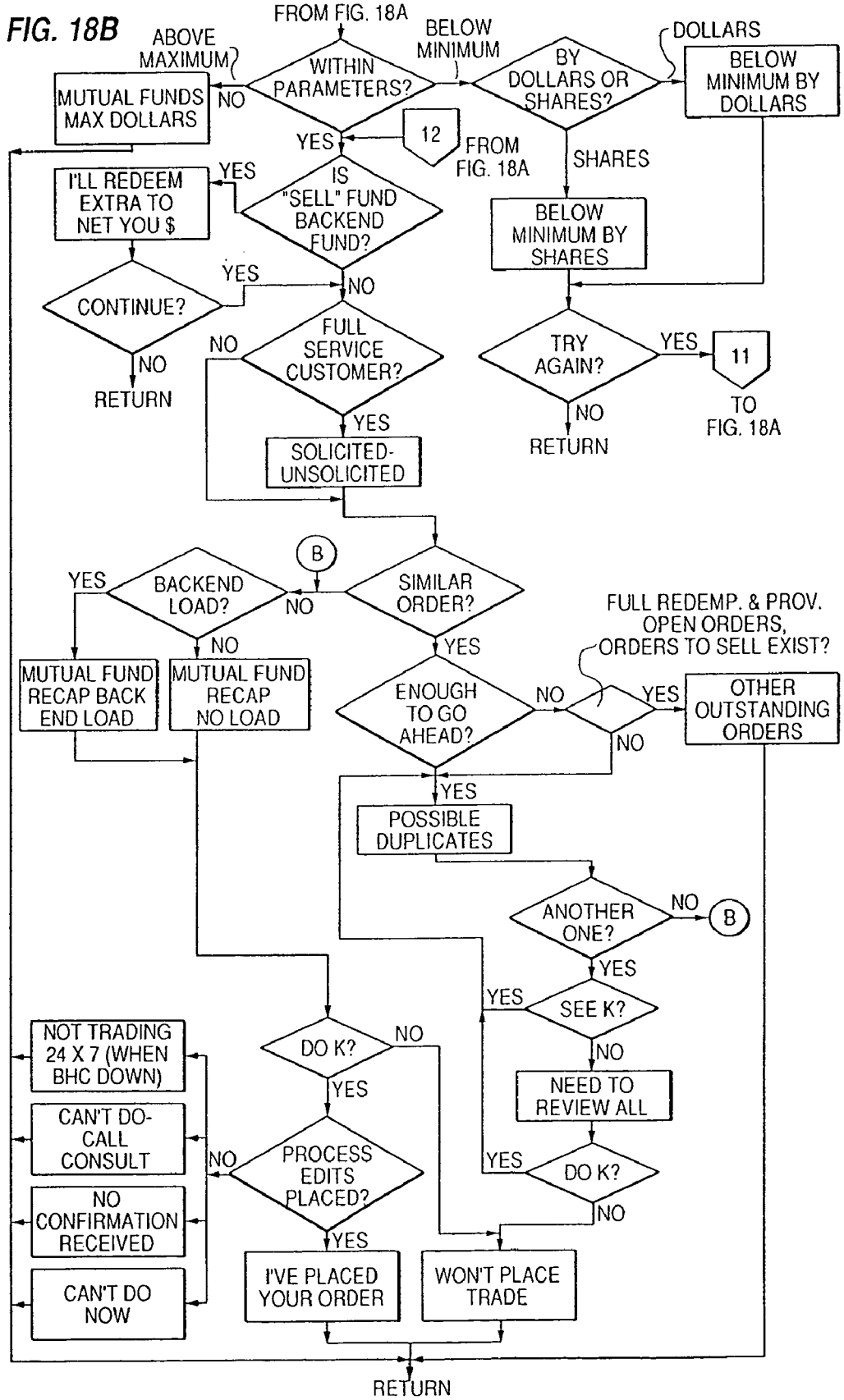

To proceed with the requested sale, the system prompts the customer to indicate how the customer would like to sell the security. Specifically, the customer may be given the option of selling by number of shares, by dollar amount, or by selling the customer's entire position. If full redemption is requested, the process continues as shown in FIG. 18B. If the customer wishes to sell by shares, the customer is requested to indicate how many shares to sell by inputting the amount on a displayed numerical keypad. The system then determines whether the number of shares provided by the customer is more than the customer then holds. If so, an "error" condition is displayed to the customer and the customer is given the option of returning to an earlier display. If a valid amount is requested, the process continues as shown in FIG. 18B.

In a similar manner, if the customer requests to sell by dollar amount, the system determines whether the requested amount is greater than the asset value of the customer's holdings. If so, the customer is given the option of inputting a new amount. If the customer has input an amount equal to or less than the dollar value of the customer's holdings, the system then determines whether the amount entered is more than a predetermined percentage, for example, 90 percent (90%) of the customer's account balance. If so, the system indicates that only up to 90 percent of the customer's account value may be redeemed, and the customer is given the option of trying again. Once a valid amount has been entered, the process continues as shown in FIG. 18B.

As indicated in FIG. 18B, the process then determines if the requested amount is within preestablished system parameters; for example, a predetermined maximum and a predetermined minimum dollar amount. If the requested transaction is greater than a maximum amount, an appropriate message is displayed which informs the customer of the maximum amount and a consultant to contact directly to perform the transaction. If the requested amount is below the minimum amount, the system displays an appropriate message depending on whether the customer requested the sale by dollar or by amount. For example, the system will display the minimum amount necessary for a sale by dollar value or by share amount and the customer is returned to an earlier option.

If the fund was a back-end fund, the system informs the customer of the amount to be deducted to cover the fee, and the customer is given the option of quitting the process. If the customer desires to continue, or if no back-end fee is applicable, the system then determines whether the customer has a full-service account. If so, the system requests that the customer indicate whether the requested transaction was solicited by a consultant and an internal record is updated based on the response. The system then determines whether any similar orders have been requested. If so, the system verifies that a sufficient number of shares are available in the customer's account to complete the latest requested transaction. If there are insufficient unencumbered funds to complete the transaction, the user is informed of this fact and returned to a previous options menu. If there are enough funds to proceed with the transaction, the system then informs the customer of the possible duplicate transactions. The customer is then given the opportunity to review each of the possible duplicate transactions. Once all possible duplicates have been reviewed, the process may continue. As the customer reviews the duplicates, the customer is given the option of cancelling the order. If cancellation is requested, a confirmation message is displayed and the customer is returned to an earlier options menu.

If no similar orders were found, the order is recapped for the benefit of the customer. This recap preferably includes the number of shares of the particular security, the account to which the proceeds of the sales should be deposited, the amount of any applicable fee, including any applicable back-end load, and the customary period for which the order will take place. At this point, the customer is given the option of cancelling the order or proceeding. If the order is cancelled, an appropriate message is displayed to the customer, and the customer may then return to a previous options menu. If the customer desires to proceed with the transaction, the system determines whether any restrictions are in place by either the brokerage system or the exchange through which the fund is traded. Any restrictions barring the requested transaction are indicated to the customer.

If no restrictions are present and the customer desires to proceed, the order is placed and an appropriate message is displayed to the customer. The customer may then return to another options menu.

Figure 19A:
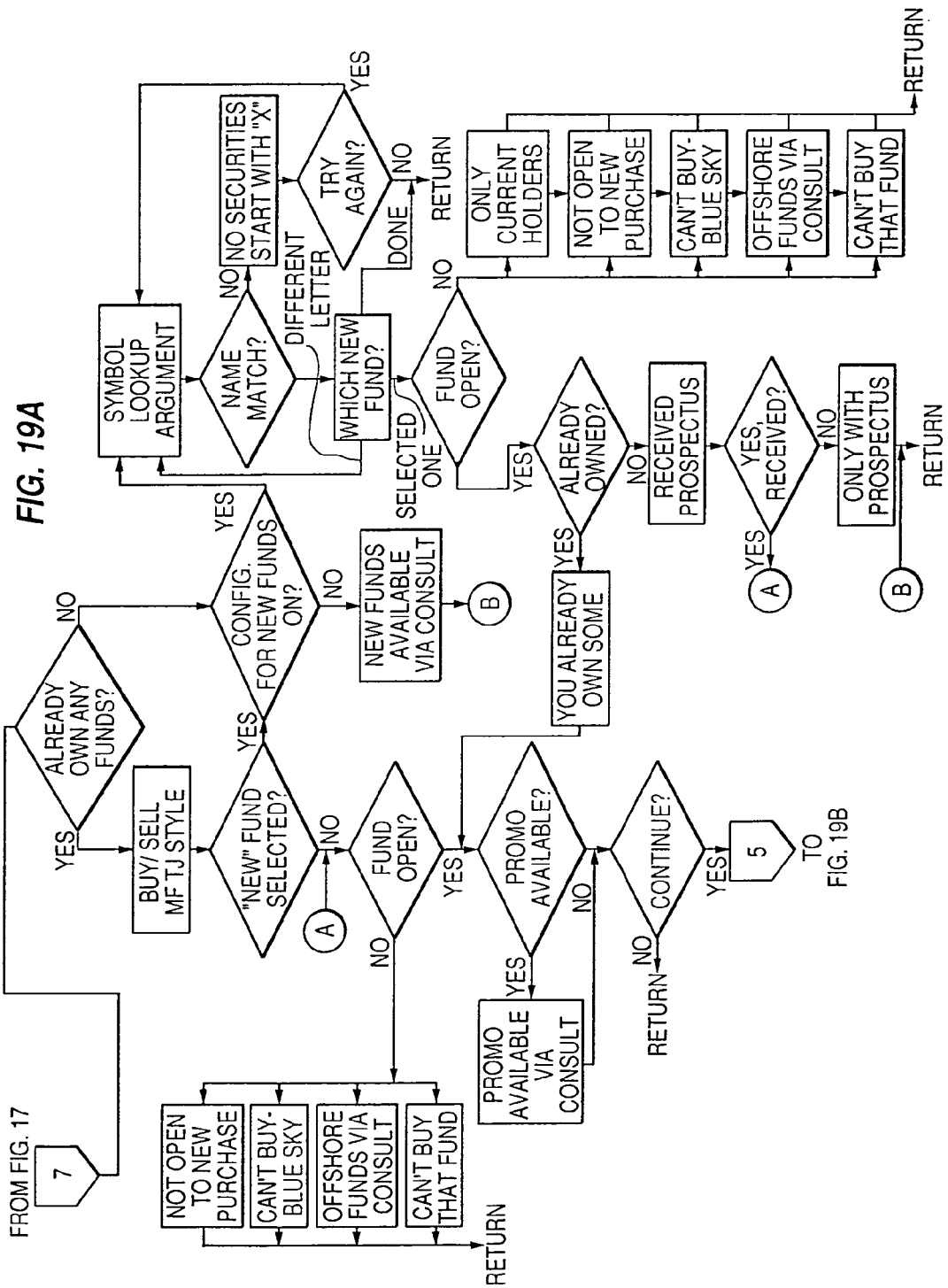
FIGS. 19A to 19C are flowcharts illustrating a process for buying mutual funds in accordance with a second embodiment of the invention.
Figure 19B:
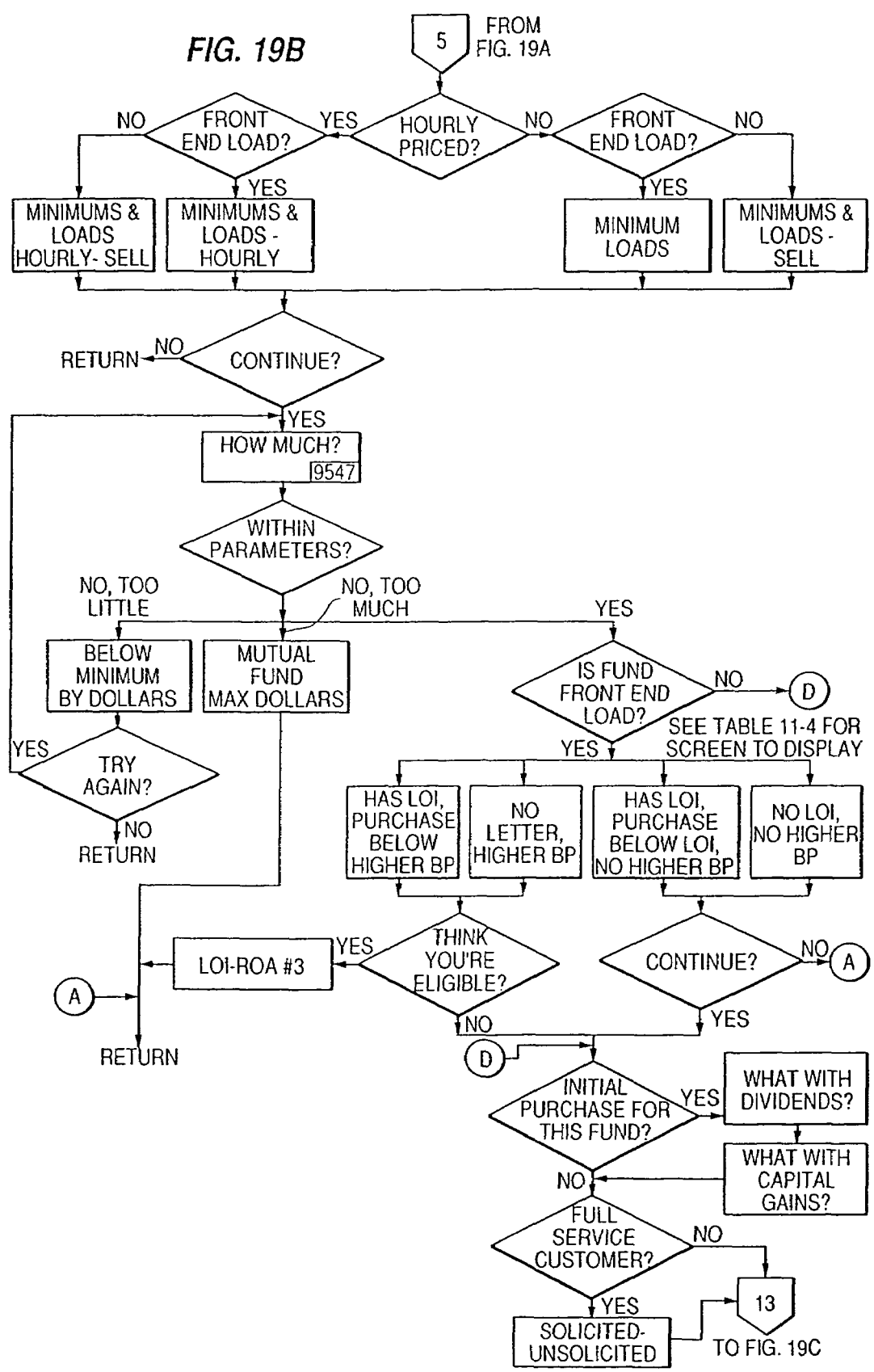
Figure 19C:
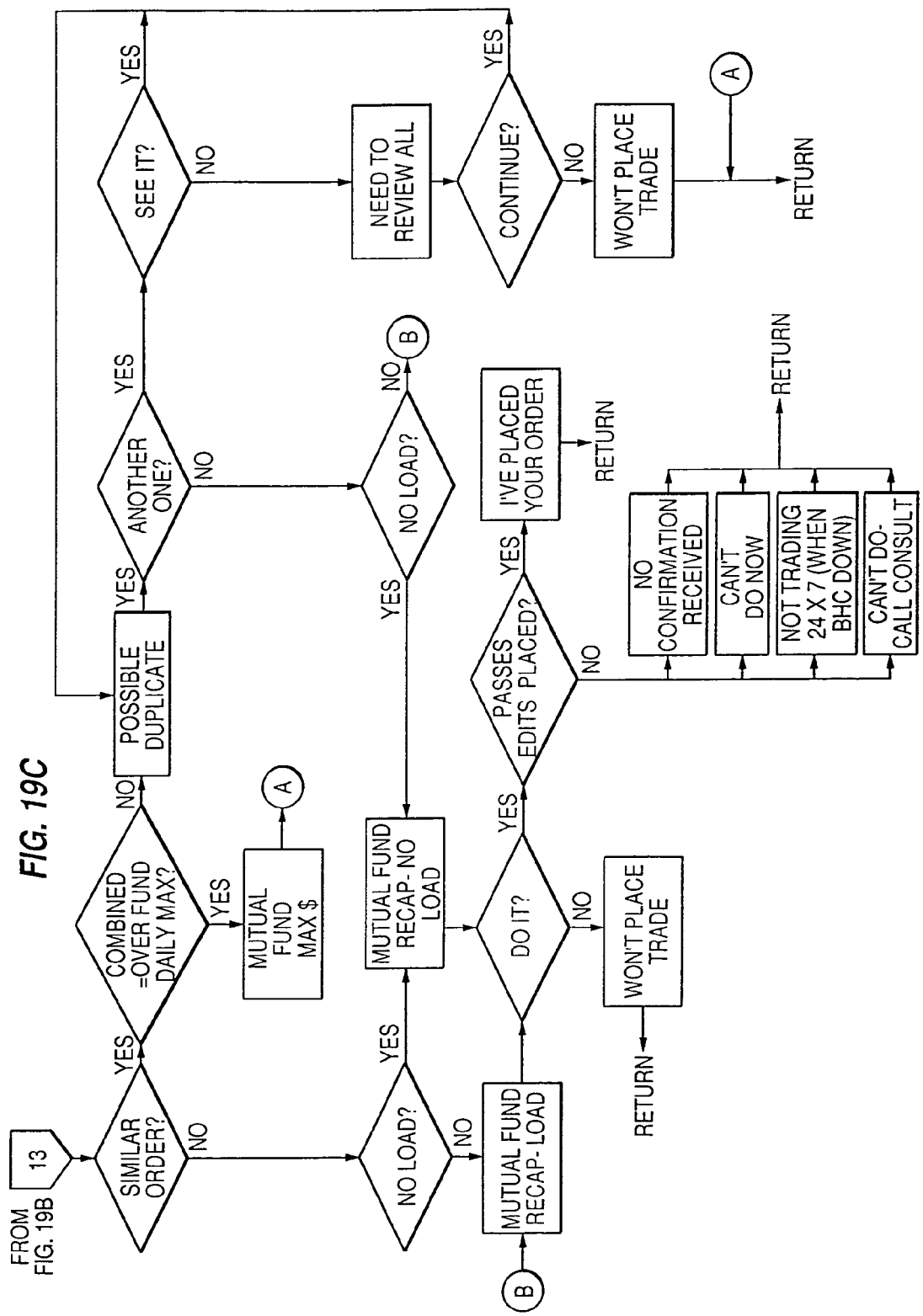

The process for buying mutual funds is described in the flowcharts spanning FIGS. 19A–19C. As shown in FIG. 19A, the system first determines whether the customer already owns any mutual funds. If a new fund is selected, the system either displays a message requesting the customer to contact a consultant about purchasing new funds or prompts the user to input a mutual fund symbol. The system then determines whether the inputted symbol matches a name stored in the system's directory. If not, the user is informed that no match was found and is given the option of trying again. If more than one fund is found, the user is given the option of selecting one matching fund.

Once a new fund has been selected in this manner, the system determines whether the fund is open for purchase. This involves determining whether the fund is available only to current holders, whether it is not open to new purchase, whether it is restricted due to "blue sky" restrictions, whether the selected fund is an off-shore fund requiring consultation, or if any other system restrictions exist. Once each applicable restriction has been displayed to the user, the customer is returned to an earlier options menu.

If the fund is open for sale, the system determines whether the user already owns any shares of the selected fund. If no shares are already owned, the customer is asked whether the customer has received a prospectus. If not, the customer is informed that no purchase is permitted until a prospectus has been reviewed by the customer and the customer is returned to an earlier options menu.

If the customer already owns shares of the selected fund, the system confirms this fact and the process continues as shown in FIG. 19A.

If the customer already owns shares of the selected mutual fund, the system then displays the symbol and name of each fund owned by the customer. If the fund is open for sale, it is next determined whether any promotional conditions exist. This is accomplished by consulting system variables associated with each fund. If a promotion is available, a message is displayed stating that the fund may have a special offer for qualifying customers, and indicates a consultant for the customer to contact if interested. If the customer chooses to continue or if no promotions are in effect, the process then continues as shown in FIG. 19B.

As shown in FIG. 19B, the system determines whether the mutual fund is hourly priced and whether a front-end load apply to the purchase of the fund. Once this information has been obtained, the system displays the security's last available price, and indicates whether it was available on the hour. Any applicable front-end load is also displayed. The customer is then given the opportunity to proceed with the purchase or to return to an earlier options menu.

If the customer chooses to continue with the purchase the system requests that the customer input the amount of purchase. The system then verifies that the requested amount is within predetermined parameters, such as a maximum and a minimum dollar amount. If the requested amount is below a minimum dollar amount, the minimum amount is displayed to the customer and the customer is given the option of inputting a greater amount. If the customer selects an amount which is greater than the maximum amount, the maximum amount is displayed to the customer and the customer is returned to an earlier options menu.

If the amount selected by the customer is within the system parameters, the system continues depending on whether a front-end load is applicable. If a front-end load applies to the purchase, the sales charges for the purchase is displayed. If applicable for the selected fund, the system may also display a breakpoint. As known in the art, the breakpoint provides for a reduced fee if the purchaser or members of the purchaser's family have more than a fixed amount in the family of funds. The customer is given the option of indicating whether he or she feels that a reduced fee is available. If so, the customer is provided with a referral to contact in order to fill out a letter of intent (LOI). If the customer has already filled out such a letter of intent, or if no reduced fee is available, the customer is given the option of continuing.

The purchase process continues by determining whether the requested purchase is an initial purchase for the selected fund. If so, the customer is prompted to indicate whether to reinvest or transfer dividends to another account. A similar selection is made for future capital gains. If it is not the initial purchase, the previous selections are maintained. The system then determines whether the customer has a full-service account in order to obtain the information mentioned above. If the customer does not have a full-service account, or the customer has indicated whether or not a consultant had been contacted, the process continues as shown in FIG. 19C.

As shown in FIG. 19C, the process determines whether any similar orders exist. If so, the system determines whether the requested purchase amount is over a daily fund maximum. If so, the daily fund maximum amount is displayed and the customer is given the option of performing another transaction or of quitting. If the requested amount is below the daily maximum, the customer is informed that a possible duplicate might exist. By displaying the purchase amount, the security, the source and destination, and the time at which the transaction will take place. The customer is prompted to review each possible duplicate and to indicate whether or not to continue. Once this process has taken place, the customer may proceed. The system then displays a recap of the requested purchase, including the amount, security name, and any applicable purchase fee. The customer is then requested to confirm that it is desired to complete the transaction.

If the customer desires to proceed with the requested buy order, the system verifies whether any restrictions are applicable. For example, the system determines whether a confirmation has been received, whether the system has imposed any restrictions, whether the channels through which the purchase is made are unavailable, or whether it is necessary to contact a consultant. If each of these criteria are met, the system indicates that the order has been placed and the customer may then return to an earlier options menu.

Figure 20A:
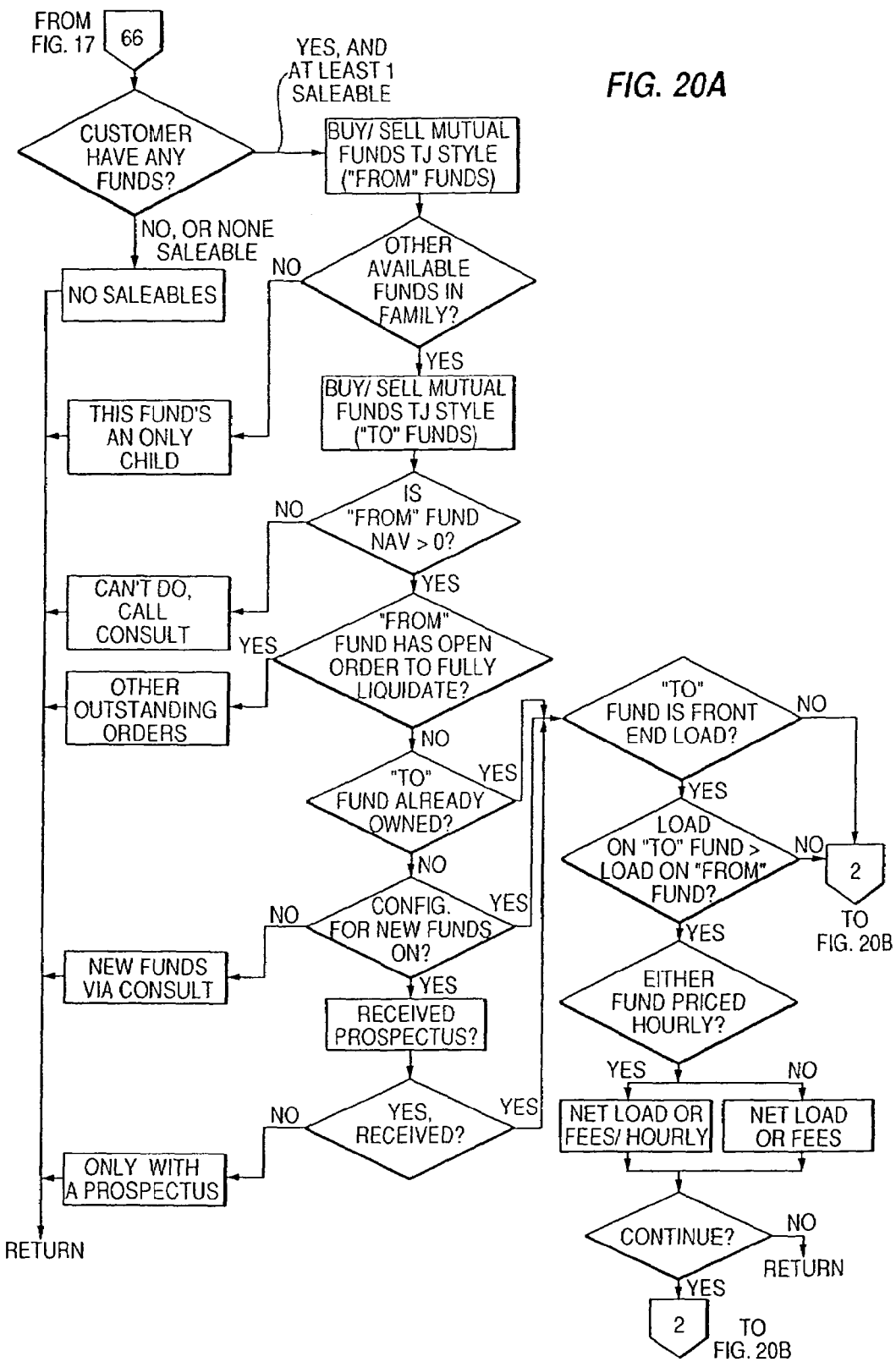
FIGS. 20A to 20C are flowcharts illustrating a process for exchanging mutual funds in accordance with a second embodiment of the present invention.
Figure 20B:
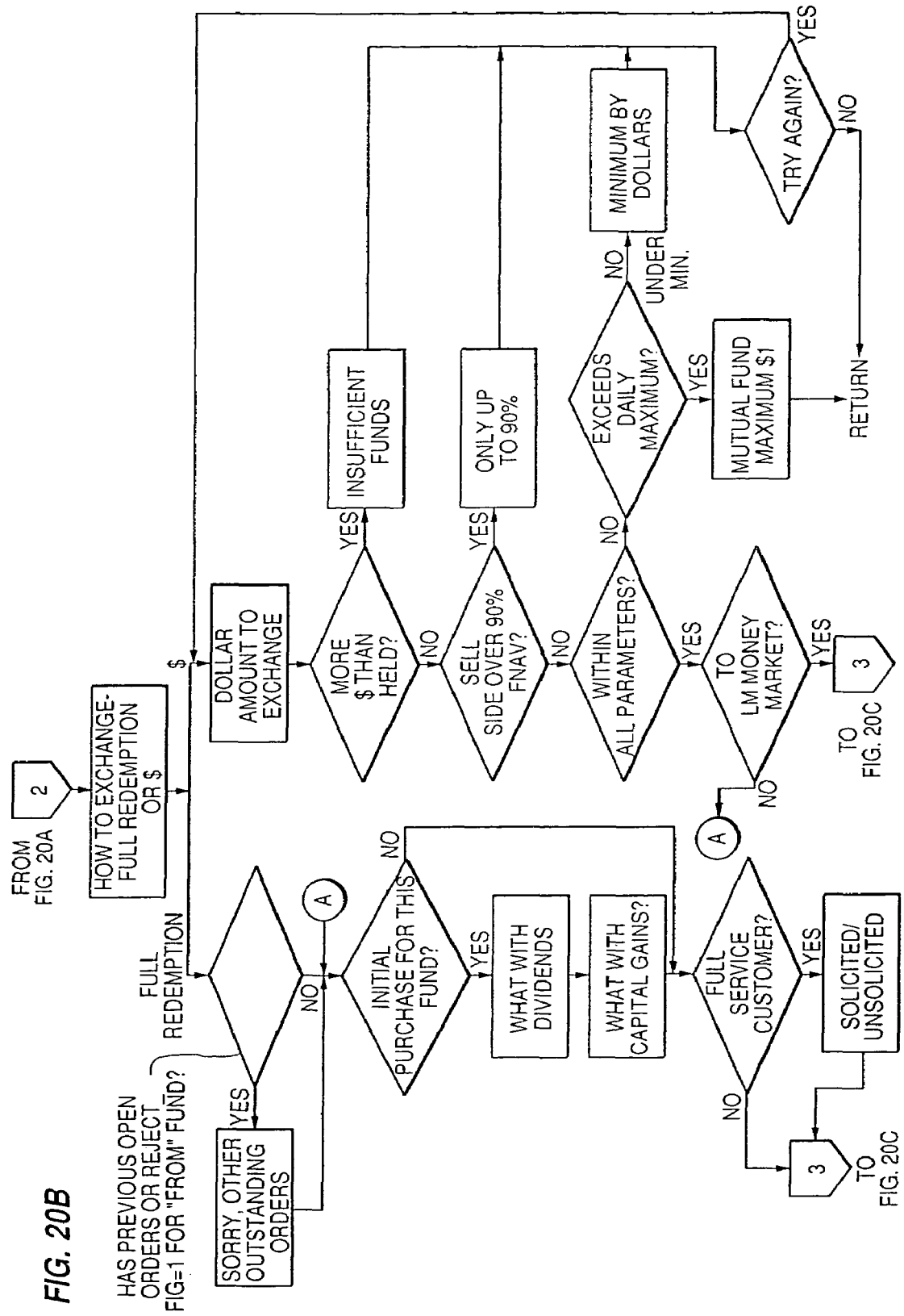
Figure 20C:
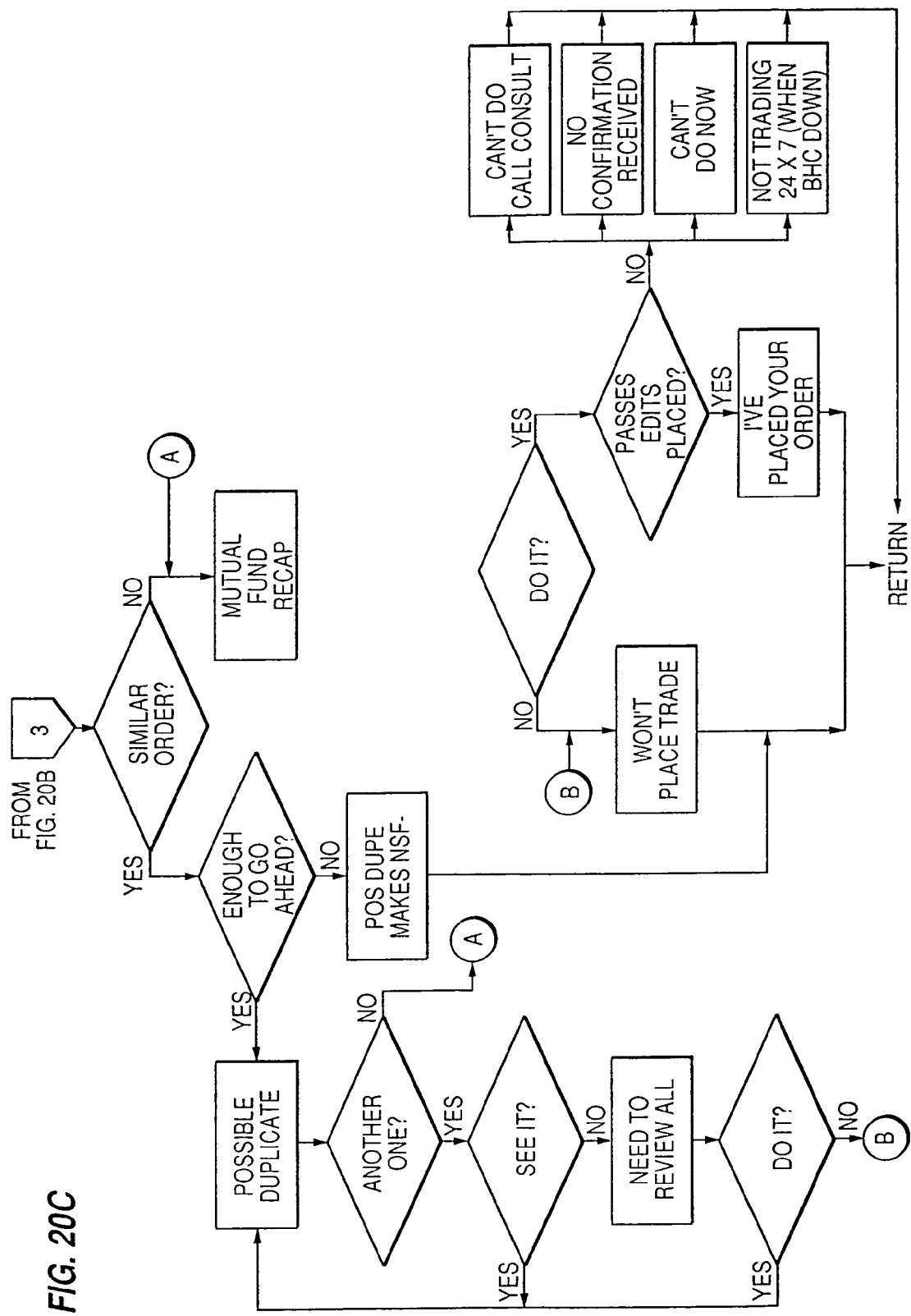

The process for exchanging mutual funds is illustrated in the flowcharts of FIGS. 20A–20C. As shown in FIG. 20A, it is first determined whether the customer has any saleable funds. If not, an appropriate message is displayed to the customer who may then return to a previous options menu. If the customer has at least one saleable fund, the customer's saleable funds are displayed, and the customer is prompted to select a fund from which an exchange is to be made. Once a "from" fund has been selected, the system determines whether any other funds in the fund family are available for exchange. If not, a message is displayed indicating that the selected fund is the only fund in the family. If other funds are available, a list is displayed for the customer to select from.

Once the customer indicates a particular fund as a "to" fund, the system determines whether the NAV of the "from" fund is greater than zero. If not, an appropriate message is displayed and the customer is asked to contact a consultant. If the NAV is greater than zero, then the system determines whether the "from" fund has an open order to be fully liquidated. If so, the system displays the outstanding order to liquidate and the customer is returned to an earlier options menu.

If meeting the previously described criteria, the system then determines whether the "to" fund is already owned by the customer. If not, the system determines whether the customer is eligible to proceed. If not eligible to proceed, a message is displayed indicating that the customer should contact an appropriate consultant. If configured for new funds, the customer is asked whether a prospectus for the selected "to" fund has been received. If so, the customer may proceed. If not, the customer is informed that a prospectus is required.

Once these steps have been performed, the system determines whether the "to" fund has a front-end load associated with it. If not, the process continues as shown in FIG. 20B. If a front-end load is applicable, the system determines whether the load on the "to" fund is greater than the load on the "from" fund. If not, the process continues as shown in FIG. 20B. If the load on the "to" fund is greater than the "from" fund, then the system determines whether the fund is priced hourly. The system then displays the net load or fees which are applicable based on the hourly-updated price or the last available price, and the customer is given the option of continuing.

As shown in FIG. 20B, the user is prompted to indicated whether to exchange by full redemption or by a dollar amount. If full redemption is indicated, the system determines whether the customer has previous open orders or whether any restriction exists for the "from" fund. In either case, a message is displayed indicating that the transaction cannot proceed. If neither condition is met, then the system determines whether the requested transaction is the initial purchase for the fund. If so, then the system determines what the customer wishes to do with dividends and capital gains earned; for example, whether to reinvest these amounts or to transfer to another account. The system also determines whether the customer has a full-service account and, if so, whether the requested transaction was made after consultation. The process then continues as shown in FIG. 20C.

If the customer indicates a dollar amount for exchange, the system determines whether the amount is more than the total amount held by the customer, whether the amount is less than a 90 percent (90%) total holdings limit, and whether the requested amount is within system parameters. For example, the system determines whether the requested amount exceeds a daily maximum or a daily minimum and, if so, displays the applicable limits. If all such criteria are met, the process continues as shown in FIG. 20C.

In FIG. 20C, the system next determines whether any similar order has been made. If not, a recap of the requested exchange is displayed to the customer and a confirmation is requested. If the customer cancels the transaction, the system confirms the cancellation and the customer may then return to another options menu. If confirmation is provided, the system determines whether certain criteria are met. These include whether it is necessary to contact a consultant, whether confirmation had not accurately been received, whether the system is unavailable at that time, and whether the brokerage system is down. If these criteria are met, the system indicates that the order has been placed.

If a similar order was discovered, the system calculates whether enough shares would be left over after the similar order had been placed. If not, the customer is informed of the possible insufficient funds and is given the option of returning to an earlier options menu.

If there are enough funds to cover both transactions, the customer is informed of each possible duplicate order. Once all possible duplicates have been reviewed, the customer may then proceed with the transaction upon providing an appropriate confirmation.

According to these processes, the method and system according to the second embodiment permits one to buy sell or exchange mutual funds. Moreover, the customer is informed of applicable fees and any promotional offers. As indicated, these transaction are performed in compliance with applicable regulatory provisions.

Figure 21:
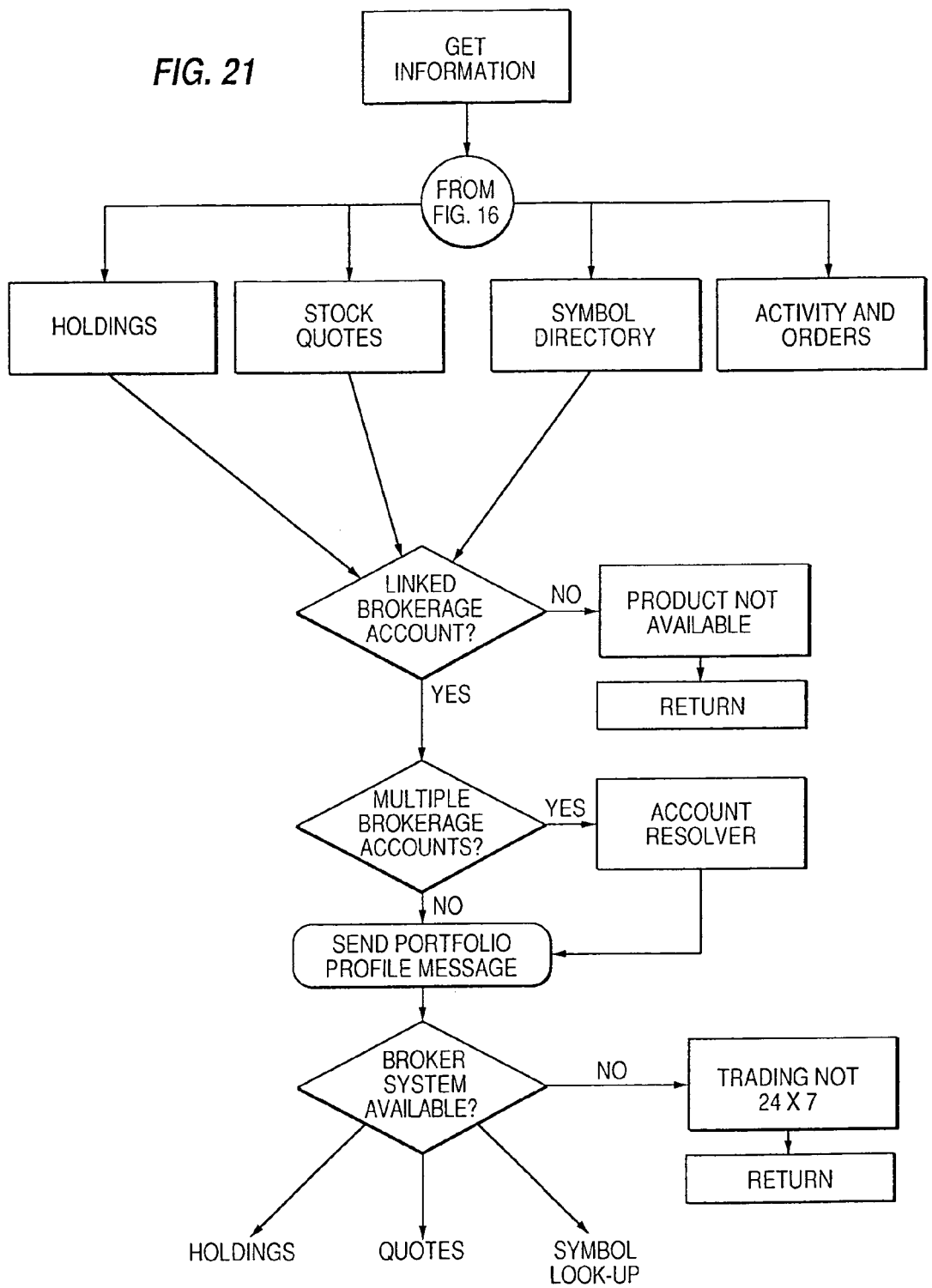
FIG. 21 is a process for obtaining information, including mutual fund and stock quotations, in accordance with a second embodiment of the present invention.

If the customer selects the "get information" option, as indicated in FIG. 16, the process continues as shown in FIG. 21. Upon selection of the "get information" option, the customer may then select one of a "holdings" option, a "stock quotes" option, a "symbol directory" option, or an "activity and orders" option. The fourth option permits the customer to review previously made orders and account activity in a manner similar to that described above with respect to the first embodiment of the invention. Selection of any of the first three options results in the following process.

The system determines whether the customer has a linked-brokerage account. If not, the system indicates that the selected option is not available and the customer is returned to a previous options menu. If the customer does have a brokerage account, the system then determines which account the customer wishes to access. The system then displays a portfolio profile message and determines whether the broker system is available. The profile message is then displayed to the customer and the system determines whether the brokerage system is available. If the brokerage system is unavailable, the situation is indicated to the customer, who may then return to a previous options menu. The system then provides information relating to the customer's total holdings, including mutual funds and stocks, provides price quotations for both stocks and mutual funds, or consults a symbol look-up table for both stocks and mutual funds in accordance with the selection of the user. These processes correspond to those described above. For example, the brokerage system consults an outside quotation provider in order to determine the most current stock and mutual fund prices.

Figure 14:
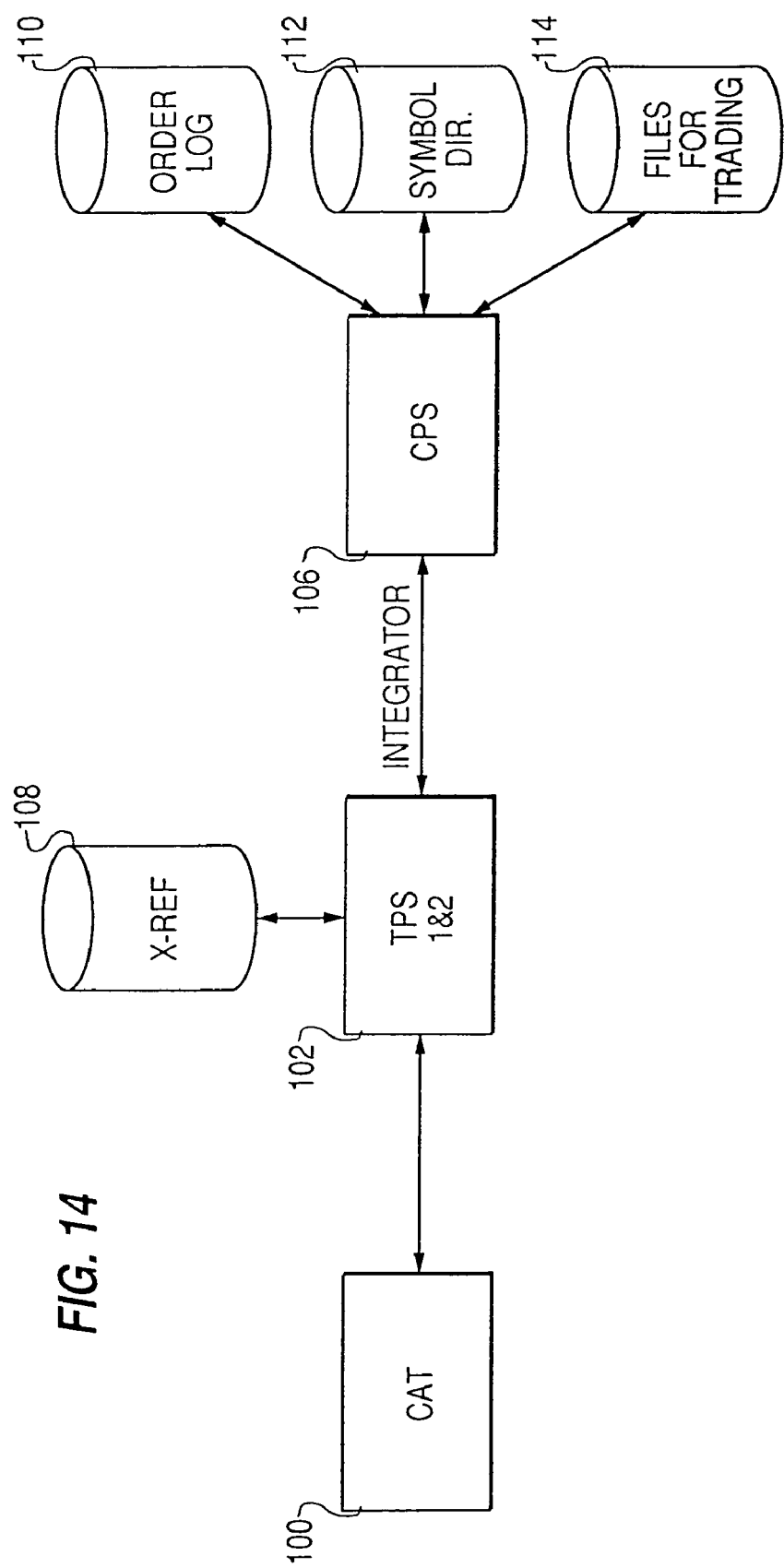
FIG. 14 is a more detailed view of a front end processor of a system according to an embodiment of the present invention.
Figure 15:
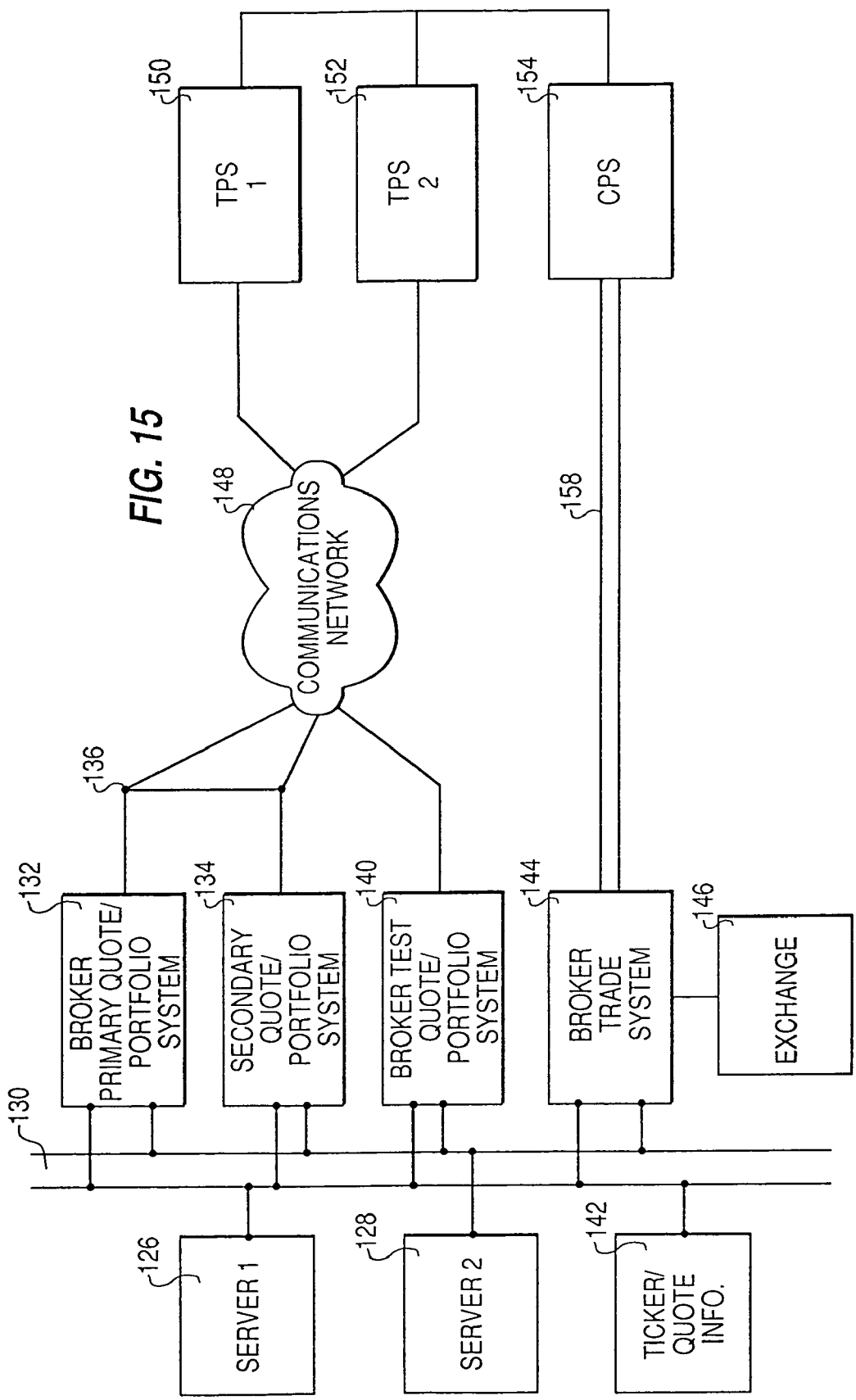
FIG. 15 is a block diagram illustrating brokerage system in communication with a front end processor system according to an embodiment of the present invention.

D. Detailed Description of System Elements (FIGS. 14–15)

As mentioned above, it is a feature of the invention that preexisting systems can be reconfigured to support a combined brokerage and non-brokerage functions provided through an ATM. Accordingly, the following discussion describes by way of example, individual systems programmed in accordance with aforementioned processes. These systems together comprise one example of an integrated financial system according to the invention. Those skilled in the art will appreciate that a vast number of alternate embodiments are available without departing from the spirit or scope of the invention.

1. CAT

Figure 1A:
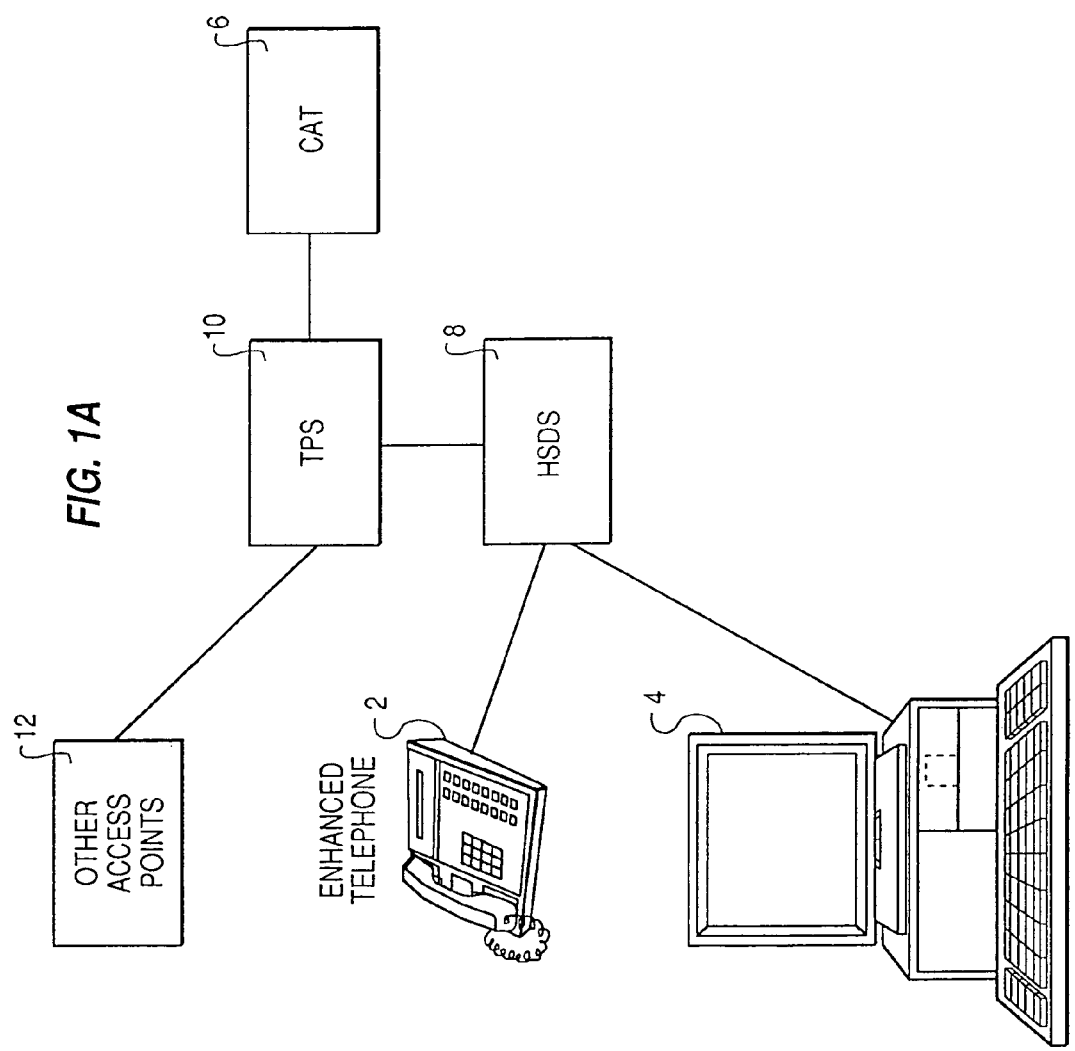
FIG. 1A is a block diagram showing various access points for communicating with a front end processor.
Figure 1B:
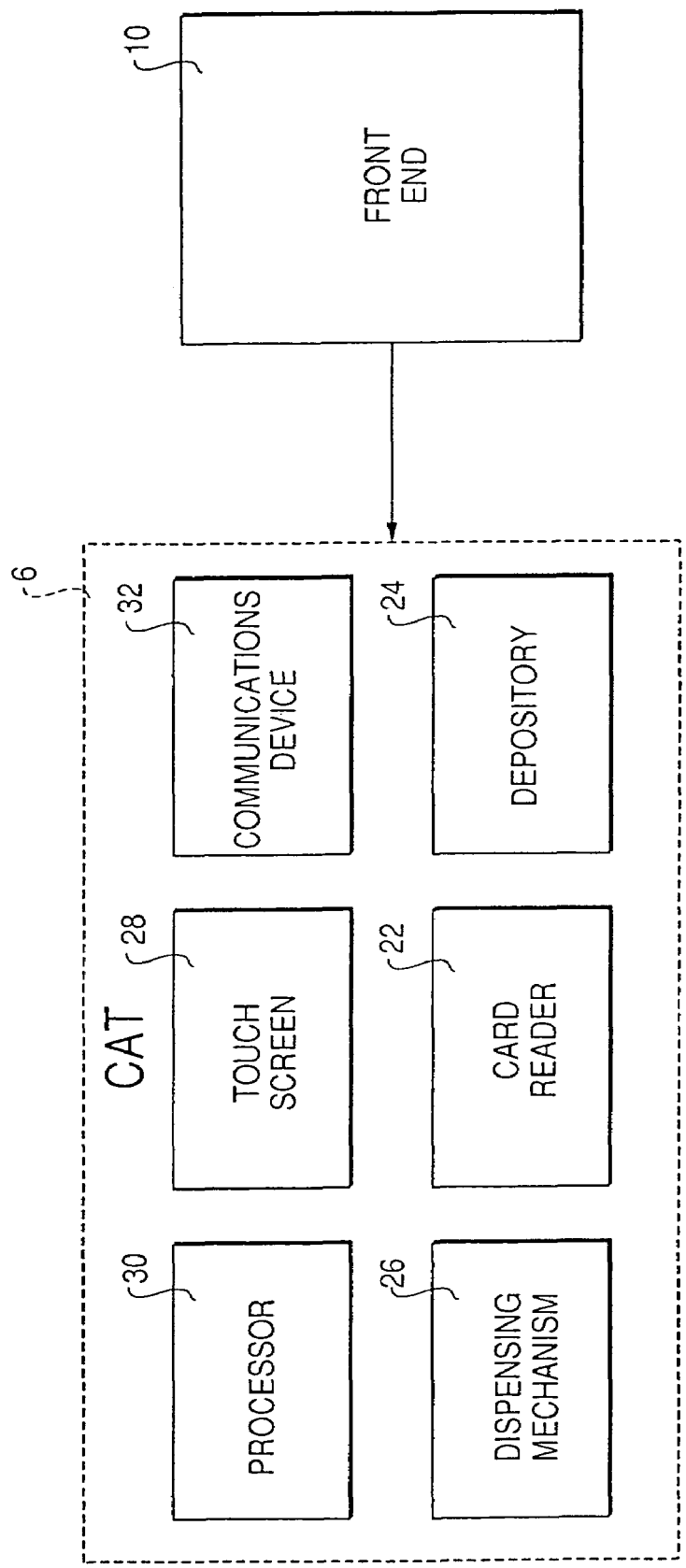
FIG. 1B is a block diagram showing elements of a customer activated terminal (CAT) which communicates with a front end system.

As described in reference to FIG. 1A, customer activated terminals (CATs) support common ATM functions such as cash withdrawals and deposits, transfers, account inquiries, and statement printing. Moreover, they feature touch screens, color displays, dip type card readers, support for several different languages, and data encryption techniques.

CATs generally include standard microcomputer architecture including a processor with associated volatile and non-volatile memory to execute various software systems. The software environment of CATs includes several communications modules and gateways, including a an integrator which handles message processing with the host or FEP. Such message processing includes initialization processes, applications requests, retries and status reports to the external service provider. Other software elements include various device drivers and communications applications, such as a communications application for communicating with a branch location which maintains the CAT.

Within this environment, a CAT or many other ATMs with comparable hardware/software support, can receive data from a front end which is displayed to a customer, as well as receive data input from the customer which is provided to various service providers. Thus, a CAT can be suitably programmed in accordance with the above-described processes.

2. TPS/CPS

As illustrated in FIG. 2, the transaction processing system is a front end processor which supports several access points, including a CAT 100. In the example shown in FIG. 14, two TPS Locations 102 are linked to a regional interface (CPS) 106 via a common integrator 104. CPS 106 thus provides multi-region applications, and, as described in greater detail below, enables communications between a brokerage system which implements trade orders and real-time quote requests (as well as other financial providers). In this example, CPS 106 also permits portfolio evaluation based on real time information provided by the brokerage system.

Brokerage messages transmitted between TPS/CPS and a brokerage system may include any number of different data elements provided with a standard communications protocol. For example, data elements for trade requests may include date and time, type of action (order, cancel status request), order side (buy, buy minus, buy call, sell, sell short, and so forth), quantity, price, duration of request, account number, and others. Data elements for symbol look up requests may include a ticker symbol, an issuer name, a description, and a security category or subcategory information such as common stock, preferred stock and so forth. Accordingly, TPS/CPS supports the following functions referred to above: price quotations, portfolio profile, recent brokerage activities, portfolio inquiries, trades awaiting settlement, trades saleable, trade buys, possible duplicates inquiries, possible duplicates summaries, open orders. Data elements corresponding to this information is provided to the CAT in a format compatible with the CAT's software environment.

In this example, TPS/CPS also support off-line brokerage functions. For example, CPS supports setting of quotations limit files, customer trade limit files, and symbol files. These system variables are then globally applied to customers accessing the system.

In addition to supporting brokerage functions, TPS/CPS provides other functions. For example, as shown in FIG. 14, TPS utilize a cross reference file (XREF) 108 containing data elements linking CINs, magnetic strip encoded information, and PINs with embossed numbers and customer accounts. Further, in this example, the CPS 106 also references: an order log 110 which tracks all orders sent to the brokerage system; a symbol directory 112 which is used to look up symbols recognized by the brokerage system upon request of the customer; and various files for trading 114 which keep track of brokerage requests. These elements enable initialization of an online session, verification of a request, as well as the "symbol look-up", "get information", and "recent activity" functions described above.

3. Brokerage System

As described above, the brokerage system serves to provide various functions requested by the CAT through TPS/CPS. These include trading functions, such as buying or selling at a market or limit price, providing current price quotations and portfolio evaluation.

An illustrative example of the brokerage system is illustrated in FIG. 15. As shown, two servers 126 and 128 are connected respectively to a dual ethernet 130. A primary quotation/portfolio analysis system 132 and secondary quotation/portfolio analysis system 134 are connected with each other through respective nodes 136 and through the dual ethernet. These systems and a test quotation/portfolio system 140 are connected via the dual ethernet, thereby forming a broker system local area network (LAN). These systems provide quotations and portfolio analysis based on information obtained from a ticker/quotation data system 142 operatively connected to the broker system LAN. Also forming part of the broker system LAN is system 144 which places trade orders to various securities exchanges 146.

The broker system is linked to several systems, including those described above. For example, as shown CPS 154 communications with the trade system 144 through a bisynchronous line 158. Two TPS systems 150 and 152 communicate to the quote portfolio systems through a X.25 communications network 148.

The system shown in FIG. 15 provides redundancy to ensure reliable processing. Specifically, the quotation/portfolio systems 132 and 134 comprise two RS/6000 systems connected to the TPS's 150 and 152. Only the primary system receives messages from the TPS's 150 and 152. The secondary system 134 remains in a standby state until it is detected that the primary system 132 has failed. Watchdog processes monitor the X.25 processes 148 and the query the servers 126 and 128.

According to this example, it is possible to provide the information necessary for securities trading, portfolio evaluation, and quotation inquiries to an existing banking system. These functions are supported by redundant hardware and software environments to ensure the reliability necessary to ensure customer satisfaction.

Accordingly, several preferred embodiments have been set forth in fulfillment of the various objects of the inventions. Specifically, a system and a method have been descried which providing brokerage functions through a preexisting ATM network. In particular, the present system and method permit consumer to conveniently buy and sell securities, obtain up-to-the-minute brokerage account valuation, and up-to-the-minute securities prices.

It should be recognized that these arrangements and methods are merely illustrative of the principles of the present invention. Numerous modifications and adaptations thereof will be readily apparent to those skilled in the art without departing from the spirit and scope of the present invention. For example, it will be recognized that the system can be expanding to provide other brokerage related transactions. Accordingly, the invention is only limited by the following claims.

What is claimed is:

1. A method for a user at an automatic teller machine to obtain securities information and transactions, comprising:
    the user accessing the automatic teller machine;
    the automatic teller machine prompting the user with an option to perform securities functions;
    the user selecting the option to perform securities functions;
    automatically prompting the user to select a securities function from a securities function group of obtain information, buy securities, and sell securities;
    the user selecting a securities function from the securities function group;
    if the user selects the securities function of obtain information, automatically prompting the user to select one information type from an information type group of holdings, stock quotes, symbol directory, and activity and orders;
    the user selecting an information type from the information type group;
    providing to the user information for the selected information types;
    if the user selects one securities function from the securities function group of buy securities and sell securities, automatically determining whether the user has established a linked brokerage account;
    if the user has established a linked brokerage account, automatically determining whether the user has multiple brokerage accounts;
    if the user does not have multiple brokerage accounts, automatically presenting the user with a portfolio profile message;
    automatically determining whether a broker system is available;
    if a broker system is available, automatically determining whether trading is enabled; and
    performing a trading request for enabled trading.

2. The method of claim 1, further comprising the steps of:
    automatically prompting the user as to whether the user has previously accessed securities functions;
    indicating whether the user has previously accessed securities functions; and
    if the user has not previously accessed securities functions, automatically providing to the user securities disclosure information.

3. The method of claim 1 wherein the step of providing to the user information for the selected information type further includes the steps of:
    if the user selects one from the information type group of holdings, stock quotes, and symbol directory, automatically determining whether the user has established a linked brokerage account;
    if the user has established a linked brokerage account, automatically determining whether the user has multiple brokerage accounts;
    if the user does not have multiple brokerage accounts, automatically presenting the user with a portfolio profile message;
    automatically determining whether a broker system is available; and
    automatically proceeding with obtaining information from an available broker system for the selected information type.

4. The method of claim 1 wherein the step of providing to the user information for the selected information type further includes the steps of:

if the user selects the information type option of activities and orders, automatically prompting the user to select one activities and orders selection from the activities and orders group of open orders, trades awaiting settlement, and recent activity;

the user selecting an activities and orders selection;

automatically determining whether the user has established a linked brokerage account;

if the user has established a linked brokerage account, automatically determining whether the user has multiple brokerage accounts;

if the user does not have multiple brokerage accounts, automatically presenting the user with a portfolio profile message;

automatically determining whether a broker system is available, automatically proceeding with obtaining information from an available broker system on the activities and orders selection.

5. The method of claim 4 wherein step of automatically proceeding with obtaining information from an available broker system on the activities and orders selection further includes the steps of:

if the activities and orders selection is open orders, automatically determining whether any orders are open;

if orders are open, automatically presenting the user with information on the open orders; and if no orders are open, automatically informing the user that no orders are open.

6. The method of claim 4 wherein step of automatically proceeding with obtaining information from an available broker system on the activities and orders selection further includes the steps of:

if the activities and orders selection is trades awaiting settlement, automatically determining whether any trades are awaiting settlement;

if any trades are awaiting settlement, automatically presenting the user with information on the trades awaiting settlement; and if no trades are awaiting settlement, automatically informing the user that no trades are awaiting settlement.

7. The method of claim 4 wherein step of automatically proceeding with obtaining information from an available broker system on the activities and orders selection further includes the steps of:

if the activities and orders selection is recent activity, automatically determining whether there is any recent activity;

if there is any recent activity, automatically presenting the user with the recent activity; and if there is no recent activity, automatically informing the user that there is no recent activity.

8. The method of claim 1 further comprising the step of:

if the user has not established a linked brokerage account, automatically prompting the user to select a securities function from the securities function group of obtain information, buy securities, and sell securities.

9. The method of claim 1 further comprising the steps of:

if the user has multiple brokerage accounts, automatically applying an account resolver; and automatically presenting the user with a portfolio profile message for the selected account.

10. The method of claim 1 further comprising the step of:

if a broker system is not available, automatically informing the user that trading is not available.

11. The method of claim 1 further comprising the step of:

if trading is not enabled, automatically informing the user that trading is not available.

12. The method of claim 1 wherein, if the user selects the securities function of buy securities, the step of performing the trading request further includes the steps of:

automatically prompting the user to select a security;

selecting a security;

automatically prompting a user as to whether to display the quote for the selected security;

indicating whether to display the quote for the selected security;

automatically determining whether trading is suspended;

automatically determining whether the selected security is tradable on the automatic teller machine; and automatically proceeding with the buy request for tradeable securities.

13. The method of claim 12 wherein the step of automatically proceeding with the buy request for tradeable securities further includes the steps of:

automatically prompting the user to select a number of shares to buy;

selecting a number of shares to buy;

automatically prompting the user to select one from the purchase method group of limit price and market price;

the user selecting a purchase method;

if the user selects the purchase method of limit price, automatically determining whether the limit price is at least the minimum required price;

automatically determining whether the fluctuation of the security is at least the minimum fluctuation;

automatically determining whether a minimum percentage of funds are available for purchase of securities;

automatically prompting the user to determine whether the purchase price is acceptable;

indicating whether the purchase price is acceptable; and if the purchase price is acceptable, automatically completing the buy request.

14. The method of claim 13 wherein the step of automatically completing the buy request further includes the steps of:

automatically prompting the user to specify the parameters of the purchase method selected;

specifying the parameters of the purchase method selected;

automatically prompting the user to select a purchase service option;

selecting a purchase service option;

automatically recapping the buy request;

automatically confirming the buy request; and automatically placing the order.

15. The method of claim 1 wherein, if the user selects the securities function of sell securities, the step of performing the trading request further includes the steps of:

automatically presenting the user with a salable portfolio;

automatically determining whether a salable security is available;

automatically prompting the user to select a security;

selecting a security;

automatically prompting a user as to whether to display the quote for the selected security;

indicating whether to display the quote for the selected security;

automatically presenting the user with a possible duplicate summary;

automatically prompting the user to select a number of shares of salable securities to sell;

selecting a number of salable securities to sell; and automatically proceeding with the sell request.

16. The method of claim 15 wherein the step of automatically proceeding with the sell request further includes the steps of:

automatically determining whether the price of the selected security is at least the minimum required price;

automatically determining whether at least the minimum number of shares selected for sale are selected;

automatically determining whether at least the number of shares selected for sale are held by the user;

automatically prompting the user to select one from the purchase method group of limit price and market price;

the user selecting a purchase method;

if the user selects the purchase method of limit price, automatically determining whether the limit price is at least the minimum required price;

automatically determining whether the fluctuation of the security is at least the minimum fluctuation;

automatically prompting the user to determine whether the sell price is acceptable;

indicating whether the sell price is acceptable; and if the sell price is acceptable, automatically completing the sell request.

17. The method of claim 16 wherein the step of automatically completing the sell request further includes the steps of:

automatically prompting the user to select a sell service option;

selecting a service option;

automatically recapping the sell request;

automatically confirming the sell request; and automatically placing the order.

18. The method of claim 1 wherein the automatic teller machine is a customer activated terminal.

19. The method of claim 12 wherein the step of automatically prompting the user to select a security includes the steps of:

automatically prompting the user to provide a symbol;

the user providing a symbol; and automatically confirming that the provided symbol is acceptable.

* * * * *

UNITED STATES PATENT AND TRADEMARK OFFICE
CERTIFICATE OF CORRECTION

| | | |
|---|---|---|
| PATENT NO. | : 7,110,981 B1 | Page 1 of 1 |
| APPLICATION NO. | : 09/006839 | |
| DATED | : September 19, 2006 | |
| INVENTOR(S) | : Paul Sidikman and Lawrence D. Weiss | |

It is certified that error appears in the above-identified patent and that said Letters Patent is hereby corrected as shown below:

Title Page
IN THE INVENTORS SECTION (75) -

In Line 2 of the Inventors Section, please change "Lawrence D. Weiss, Skaneatles, NY" to -- Lawrence D. Weiss, Skaneateles, NY--

IN THE REFERENCES CITED SECTION (56) - FOREIGN PATENT DOCUMENTS -

Please change "WO WO00941836 A1 * 5/1994" to -- WO WO9411836 A1 * 5/1994 --

IN THE REFERENCES CITED SECTION (56) - OTHER PUBLICATIONS -

On the Title page of the Patent, in Line 1 of the first reference, please change ""Banks deeveloping ATMs that make stock trades Anonymous"," to -- "Banks developing ATMs tht make stock trades Anonymous", --

On the Title page of the Patent, in Line 1 of the third reference, please change "American Banker, "Welles Frago Lets Customers Use ATMs to Buy" to -- American Banker, "Wells Fargo Lets Customers Use ATMs to Buy --

Signed and Sealed this

Twenty-sixth Day of December, 2006

JON W. DUDAS
*Director of the United States Patent and Trademark Office*